United States Patent
Kurihara et al.

(10) Patent No.: US 12,110,882 B2
(45) Date of Patent: Oct. 8, 2024

(54) CAPACITY CONTROL VALVE

(71) Applicant: EAGLE INDUSTRY CO., LTD., Tokyo (JP)

(72) Inventors: Daichi Kurihara, Tokyo (JP); Kohei Fukudome, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 17/926,531

(22) PCT Filed: May 24, 2021

(86) PCT No.: PCT/JP2021/019529
§ 371 (c)(1),
(2) Date: Nov. 18, 2022

(87) PCT Pub. No.: WO2021/241478
PCT Pub. Date: Dec. 2, 2021

(65) Prior Publication Data
US 2023/0193889 A1 Jun. 22, 2023

(30) Foreign Application Priority Data

May 25, 2020 (JP) ................................ 2020-090665

(51) Int. Cl.
*F16K 15/18* (2006.01)
*F04B 27/18* (2006.01)
(Continued)

(52) U.S. Cl.
CPC .............. *F04B 27/18* (2013.01); *F16K 11/22* (2013.01); *F16K 11/24* (2013.01); *F16K 15/184* (2021.08)

(58) Field of Classification Search
None
See application file for complete search history.

(56) References Cited

U.S. PATENT DOCUMENTS 2,267,515 A 12/1941 Wilcox
3,360,304 A 12/1967 Adams ..................... B61K 7/12
(Continued)

FOREIGN PATENT DOCUMENTS

EP 1835177 9/2007 .............. F04B 27/18
EP 2784320 10/2014 .............. F04B 27/18
(Continued)

OTHER PUBLICATIONS

Korean Official Action dated Dec. 1, 2023 in related Korean Patent Application Serial No. 10-2022-7041702, with translation, 5 pages.
(Continued)

*Primary Examiner* — Matthew W Jellett
(74) *Attorney, Agent, or Firm* — HAYES SOLOWAY P.C.

(57) ABSTRACT

Disclosed is a capacity control valve includes a valve housing. A main valve including a valve body is driven by a solenoid, and a main valve seat which is between a discharge port and a control port and with which the valve body can contact, a pressure sensitive valve member forms a pressure sensitive valve, together with a pressure sensitive body disposed in a pressure sensitive chamber. The control port and a suction port communicate with each other through an intermediate communication passage by opening and closing of the pressure sensitive valve. The pressure sensitive valve member has a through-hole communicating with the intermediate communication passage, and has an opening and closing member attached thereto such that the opening and closing member is restricted in movement with respect to the valve housing by restriction device and slides relative to the pressure sensitive valve member to open and close the through-hole.

19 Claims, 11 Drawing Sheets

(51) Int. Cl.
*F16K 11/22* (2006.01)
*F16K 11/24* (2006.01)

(56) References Cited

U.S. PATENT DOCUMENTS

| | | | |
|---|---|---|---|
| 4,579,145 A | 4/1986 | Lieber | F16H 61/0251 |
| 4,615,358 A | 10/1986 | Hammond | F15B 13/0402 |
| 4,895,192 A | 1/1990 | Mortenson | F01M 11/04 |
| 4,917,150 A | 4/1990 | Koch | F16K 31/0606 |
| 4,979,542 A | 12/1990 | Mesenich | F02M 47/027 |
| 4,998,559 A | 3/1991 | McAuliffe | F16H 61/0251 |
| 5,048,790 A | 9/1991 | Wells | F16K 31/383 |
| 5,060,695 A | 10/1991 | McCabe | G05D 16/2024 |
| 5,217,047 A | 6/1993 | McCabe | F16H 61/0251 |
| 5,286,172 A | 2/1994 | Taguchi | F04B 1/26 |
| 5,778,932 A | 7/1998 | Alexander | G05D 16/2024 |
| 6,161,585 A | 12/2000 | Kolchinsky | G05D 16/2024 |
| 6,354,811 B1 | 3/2002 | Ota et al. | 417/222.2 |
| 6,358,017 B1 | 3/2002 | Ota et al. | 417/222.2 |
| 6,361,283 B1 | 3/2002 | Ota et al. | 417/222.2 |
| 6,434,956 B1 | 8/2002 | Ota | 62/133 |
| 7,014,427 B1 | 3/2006 | Hirota | 417/218 |
| 8,021,124 B2 | 9/2011 | Umemura et al. | 417/222.2 |
| 8,079,827 B2* | 12/2011 | Iwa | F04B 27/1804 |
| | | | 417/222.2 |
| 8,225,818 B1 | 7/2012 | Stephens | F15B 13/0442 |
| 9,022,346 B2 | 5/2015 | Najmolhoda | F16K 31/0613 |
| 9,027,598 B2 | 5/2015 | Schneider | F16K 31/0613 |
| 9,453,518 B2 | 9/2016 | Schulz | F15B 13/043 |
| 2002/0134444 A1 | 9/2002 | Isobe | F16K 27/041 |
| 2003/0145615 A1* | 8/2003 | Sasaki | F04B 27/1804 |
| | | | 62/228.3 |
| 2004/0060604 A1 | 4/2004 | Uemura et al. | 137/595 |
| 2004/0120829 A1 | 6/2004 | Pitla et al. | F04B 1/26 |
| 2005/0076959 A1 | 4/2005 | Yamamoto | F16K 31/0624 |
| 2005/0265853 A1 | 12/2005 | Hirota | F04B 1/12 |
| 2006/0165534 A1 | 7/2006 | Umemura et al. | F04B 1/26 |
| 2006/0218953 A1 | 10/2006 | Hirota | 62/228.5 |
| 2009/0183786 A1 | 7/2009 | Iwa et al. | 137/487.5 |
| 2009/0256091 A1 | 10/2009 | Nordstrom | F16K 31/0613 |
| 2011/0089352 A1 | 4/2011 | Morgan | F16K 11/0716 |
| 2012/0198992 A1 | 8/2012 | Futakuchi et al. | 91/505 |
| 2014/0130916 A1 | 5/2014 | Saeki et al. | F16K 31/0613 |
| 2014/0369862 A1 | 12/2014 | Ota et al. | F04B 27/18 |
| 2015/0027573 A1 | 1/2015 | Ochiai | F15B 13/0402 |
| 2015/0044065 A1 | 2/2015 | Ota | F04B 27/18 |
| 2015/0044067 A1 | 2/2015 | Ota | F04B 27/1804 |
| 2015/0211506 A1 | 7/2015 | Shirafuji et al. | F04B 27/1804 |
| 2015/0345655 A1 | 12/2015 | Higashidozono et al. | |
| | | | F16K 31/0624 |
| 2017/0356430 A1 | 12/2017 | Irie et al. | F04B 27/1804 |
| 2018/0156345 A1 | 6/2018 | Kanda | F15B 13/0431 |
| 2019/0078562 A1 | 3/2019 | Hayama | F16K 11/0716 |
| 2019/0162175 A1 | 5/2019 | Higashidozono et al. | |
| | | | F04B 27/18 |
| 2020/0191139 A1 | 6/2020 | Warren et al. | F04B 49/22 |
| 2021/0180715 A1 | 6/2021 | Hayama et al. | F16K 31/122 |
| 2021/0372396 A1 | 12/2021 | Kurihara | F04B 9/12 |

FOREIGN PATENT DOCUMENTS

| | | | |
|---|---|---|---|
| EP | 3431760 | 1/2019 | F04B 27/18 |
| JP | 5306679 | 11/1993 | F04B 27/08 |
| JP | 6-200875 | 7/1994 | F04B 27/08 |
| JP | 3088536 | 7/2000 | F04B 27/08 |
| JP | 2000-345961 | 12/2000 | F04B 27/14 |
| JP | 2001-73939 | 3/2001 | F04B 27/14 |
| JP | 2001-107854 | 4/2001 | F04B 27/14 |
| JP | 2001-132632 | 5/2001 | F04B 27/14 |
| JP | 3581598 | 7/2004 | F04B 29/10 |
| JP | 2006-17035 | 1/2006 | F04B 27/14 |
| JP | 2006-52648 | 2/2006 | F04B 27/14 |
| JP | 2006-170140 | 6/2006 | F04B 27/14 |
| JP | 2006-307828 | 11/2006 | F04B 27/14 |
| JP | 4242624 | 1/2009 | F04B 49/00 |
| JP | 2011-32916 | 2/2011 | F04B 27/14 |
| JP | 4700048 | 3/2011 | F04B 49/00 |
| JP | 2011-94554 | 5/2011 | F04B 27/08 |
| JP | 5167121 | 12/2012 | F04B 27/14 |
| JP | 5557901 | 6/2014 | F04B 27/14 |
| JP | 2014-190247 | 10/2014 | F04B 27/14 |
| JP | 2015-1168 | 1/2015 | F04B 27/14 |
| JP | 2015-34509 | 2/2015 | F04B 27/14 |
| JP | 2015-34510 | 2/2015 | F04B 27/14 |
| JP | 2017-129042 | 7/2017 | F04B 27/18 |
| JP | 6206274 | 10/2017 | F04B 27/18 |
| JP | 2017-223348 | 12/2017 | F16K 11/10 |
| JP | 2018-021646 | 2/2018 | F04B 27/18 |
| JP | 2018-40385 | 3/2018 | F16K 31/06 |
| JP | 2018-145877 | 9/2018 | F04B 27/12 |
| WO | WO2007119380 | 10/2007 | F04B 27/14 |
| WO | WO2013109005 | 7/2013 | F04B 27/14 |
| WO | WO2014091975 | 6/2014 | F04B 27/14 |
| WO | WO2014119594 | 8/2014 | F04B 27/14 |
| WO | WO2017057160 | 4/2017 | F04B 27/18 |
| WO | WO2017159553 | 9/2017 | F04B 27/18 |
| WO | WO2018043186 | 3/2018 | F04B 27/18 |
| WO | WO2018207461 | 11/2018 | F04B 27/18 |
| WO | WO2019131703 | 7/2019 | F04B 27/18 |
| WO | WO2019167912 | 2/2021 | F04B 27/18 |

OTHER PUBLICATIONS

Notice of Allowance issued in related U.S. Appl. No. 17/926,526, dated Feb. 7, 2024, 8 pgs.

International Preliminary Report on Patentability issued in PCT/JP2021/019528, dated Dec. 8, 2022, with English translation, 6 pages.

International Search Report and Written Opinion issued in PCT/JP2021/019528, dated Jul. 6, 2021, with English translation, 10 pages.

International Preliminary Report on Patentability issued in PCT/JP2021/019529, dated Dec. 8, 2022, with English translation, 6 pages.

International Search Report and Written Opinion issued in PCT/JP2021/019529, dated Jul. 5, 2021, with English translation, 10 pages.

Korean Official Action dated Mar. 14, 2023 in related Korean Patent Application Serial No. 10-2022-7041703, with translation, 5 pages.

* cited by examiner

CAPACITY CONTROL VALVE

TECHNICAL FIELD

The present invention relates to a capacity control valve that variably controls capacity of a working fluid, for example, to a capacity control valve that controls a discharge amount of a variable displacement compressor used for an air conditioning system of an automobile according to pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of fluid. This tilt angle of the swash plate can be continuously changed by appropriately controlling pressure in a control chamber while utilizing a suction pressure Ps of a suction chamber that suctions the fluid, a discharge pressure Pd of a discharge chamber that discharges the fluid pressurized by the pistons, and a control pressure Pc of the control chamber that houses the swash plate, by means of a capacity control valve to be driven to open and close by electromagnetic force.

At the time of continuously driving the variable displacement compressor, the capacity control valve performs normal control in which energization is controlled by a control computer, a valve body is moved in an axial direction by electromagnetic force generated in a solenoid, and a main valve provided between a discharge port through which a discharge fluid of the discharge pressure Pd passes and a control port through which a control fluid of the control pressure Pc passes is opened and closed to adjust the control pressure Pc of the control chamber of the variable displacement compressor.

During normal control of the capacity control valve, the pressure of the control chamber in the variable displacement compressor is appropriately controlled, and the tilt angle of the swash plate with respect to the rotating shaft is continuously changed to change the stroke amount of the pistons and to control the amount of discharge of the fluid to the discharge chamber, so that the air conditioning system is adjusted to have a target cooling capacity. In addition, when the variable displacement compressor is driven at the maximum capacity, the main valve of the capacity control valve is closed to lower the pressure of the control chamber, so that the tilt angle of the swash plate is maximized.

In addition, a configuration has been known in which an auxiliary communication passage is formed that provides communication between a control port and a suction port of a capacity control valve, and a refrigerant of a control chamber of a variable displacement compressor is discharged to a suction chamber of the variable displacement compressor through the control port, the auxiliary communication passage, and the suction port at a start-up, to rapidly lower the pressure of the control chamber at the start-up, so that the responsiveness of the variable displacement compressor is improved (refer to Patent Citation 1).

CITATION LIST

Patent Literature

Patent Citation 1: JP 5167121 B2 (PAGE 7 and FIG. 2)

SUMMARY OF INVENTION

Technical Problem

However, according to the configuration disclosed in Patent Citation 1, a fluid discharge function at a start-up is good, but at the time of continuously driving the variable displacement compressor, the auxiliary communication passage allows communication, and the refrigerant flows from the control port into the suction port, so that the refrigerant circulation amount increases and the operating efficiency of the variable displacement compressor decreases, which is a problem.

The present invention is conceived in view of such a problem, and an object of the present invention is to provide a capacity control valve having a fluid discharge function at a start-up and having good operating efficiency.

Solution to Problem

In order to solve the foregoing problem, according to the present invention, there is provided a capacity control valve including: a valve housing provided with a discharge port through which a discharge fluid of a discharge pressure passes, a suction port through which a suction fluid of a suction pressure passes, and a control port through which a control fluid of a control pressure passes; a main valve including a valve body driven by a solenoid, and a main valve seat which is provided between the discharge port and the control port and with which the valve body is allowed to come into contact; a pressure sensitive body disposed in a pressure sensitive chamber; and a pressure sensitive valve member extending from the valve body to the pressure sensitive chamber and forming a pressure sensitive valve, together with the pressure sensitive body. An intermediate communication passage is formed in the valve body and in the pressure sensitive valve member, and the control port and the suction port are allowed to communicate with each other through the intermediate communication passage by opening the pressure sensitive valve. The pressure sensitive valve member provided with a through-hole communicating with the intermediate communication passage, and has an opening and closing member attached thereto such that the opening and closing member is restricted in movement with respect to the valve housing by a restriction device and slides relative to the pressure sensitive valve member to open and close the through-hole. According to the aforesaid feature of the present invention, when the main valve is controlled in an energized state, the opening and closing member that is restricted in movement with respect to the valve housing by the restriction device is slid in a closing direction relative to the pressure sensitive valve member, to close at least a part of the through-hole of the pressure sensitive valve member, so that a flow of a fluid from the control port into the suction port can be prevented or reduced. On the other hand, when the main valve is closed at a start-up and in a maximum energized state, the opening and closing member is slid in an opening direction relative to the pressure sensitive valve member, to open the through-hole of the pressure sensitive valve member more than during normal control, thereby providing communication between the control port and the suction port, so that the control pressure can be quickly lowered. In such a manner, the discharge of a liquid refrigerant and the operating efficiency at a start-up of a variable displacement compressor can be improved.

It may be preferable that the opening and closing member includes an annular portion that is slidable relative to the pressure sensitive valve member. According to this preferable configuration, since the annular portion is continuous in a circumferential direction without interruption, the through-hole of the pressure sensitive valve member can be reliably closed by the annular portion.

It may be preferable that the restriction device includes an elastic body restricting movement of the opening and closing member. According to this preferable configuration, since the movement of the opening and closing member with respect to the valve housing can be restricted within a predetermined range by elastic deformation of the elastic body, it is possible to prevent damage to the opening and closing member.

It may be preferable that the elastic body is a pair of springs that press the opening and closing member in an opening direction and in a closing direction, respectively. According to this preferable configuration, the timing when the through-hole of the pressure sensitive valve member is opened and closed by the opening and closing member can be adjusted by a difference in spring constant between the pair of springs.

It may be preferable that the elastic body presses the opening and closing member toward a flange portion formed in the pressure sensitive member on a side of the pressure sensitive body with respect to the through-hole of the pressure sensitive valve member. According to this preferable configuration, while positioning a closed position of the opening and closing member, it is possible to secure a closed state of the through-hole of the pressure sensitive valve member using the opening and closing member.

It may be preferable that the restriction device includes a stopper that comes into contact with the opening and closing member. According to this preferable configuration, by changing the contact position of the stopper with respect to the opening and closing member, it is possible to change the opening start position or the opening amount of the through-hole of the pressure sensitive valve member set by the opening and closing member during stroke of the valve body and the pressure sensitive valve member, and the setting of the opening start position or the opening amount is facilitated.

It may be preferable that the restriction device restricts movement of the opening and closing member by fixing the opening and closing member to the valve housing. According to this preferable configuration, a spring or the like is not required for the restriction device, and the structure can be simplified.

It may be preferable that a dimension of the through-hole in an axial direction of the pressure sensitive valve member is equal to or less than a maximum stroke amount of the valve body. According to this preferable configuration, since the opening and closing member can be slid relative to the pressure sensitive valve member to fully open the through-hole, a wide cross-sectional area of the flow passage can be secured.

DESCRIPTION OF EMBODIMENTS

Modes for carrying out a capacity control valve according to the present invention will be described below based on an embodiment.

First Embodiment

Figure 1:
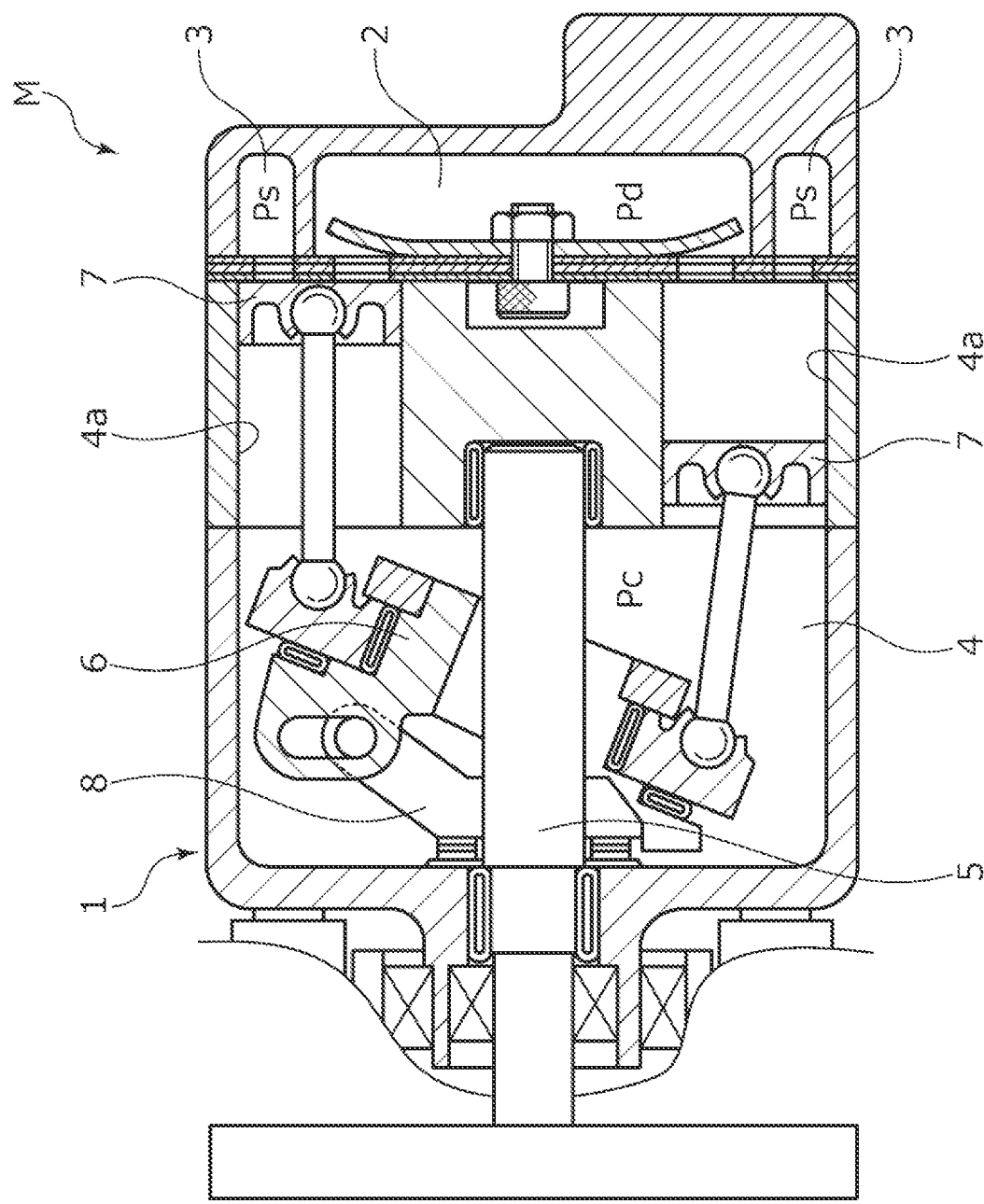
FIG. 1 is a schematic configuration view showing a swash plate-type variable displacement compressor into which a capacity control valve according to a first embodiment of the present invention is assembled.
Figure 2:
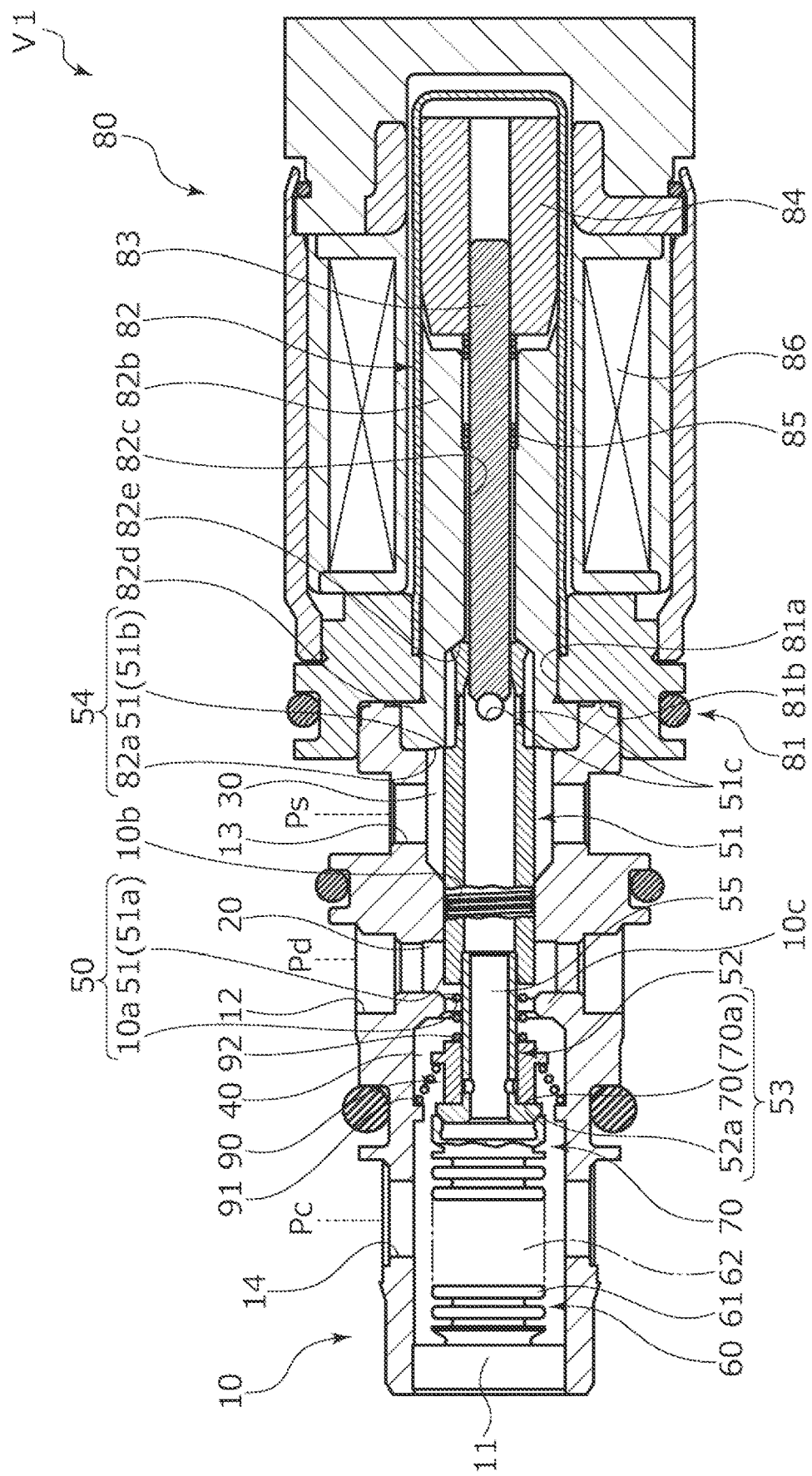
FIG. 2 is a cross-sectional view showing a state where a main valve is opened and through-holes of a pressure sensitive valve member are closed by an opening and closing member in a non-energized state of the capacity control valve of the first embodiment.

A capacity control valve according to a first embodiment of the present invention will be described with reference to FIGS. 1 to 4. Hereinafter, a description will be given based on the assumption that the left and right sides when seen from the front side of FIG. 2 are left and right sides of the capacity control valve. In detail, a description will be given based on the assumption that the left side of the drawing sheet on which a pressure sensitive body 60 is disposed is the left side of the capacity control valve and the right side of the drawing sheet on which a solenoid 80 is disposed is the right side of the capacity control valve.

A capacity control valve V1 of the present invention is assembled into a variable displacement compressor M used for an air conditioning system of an automobile, etc., and by variably controlling the pressure of a working fluid (hereinafter, simply referred to as a "fluid") that is a refrigerant, controls the discharge amount of the variable displacement compressor M to adjust the air conditioning system to have a target cooling capacity.

First, the variable displacement compressor M will be described. As shown in FIG. 1, the variable displacement compressor M includes a casing 1 including a discharge chamber 2, a suction chamber 3, a control chamber 4, and a plurality of cylinders 4a. Incidentally, the variable displacement compressor M is provided with a communication passage (not shown) through which the control chamber 4 and the suction chamber 3 communicate directly with each other, and the communication passage is provided with a fixed orifice that balances the pressures of the suction chamber 3 and the control chamber 4.

In addition, the variable displacement compressor M includes a rotating shaft 5 to be driven and rotated by an engine (not shown) installed outside the casing 1; a swash plate 6 coupled to the rotating shaft 5 so as to be tiltable by a hinge mechanism 8 in the control chamber 4; and a plurality of pistons 7 that are coupled to the swash plate 6 and that are reciprocatably fitted in the respective cylinders 4a, and appropriately controls pressure in the control chamber 4 by means of the capacity control valve V1 to be driven to open and close by electromagnetic force, while utilizing a suction pressure Ps of the suction chamber 3 that suctions the fluid, a discharge pressure Pd of the discharge chamber 2 that discharges the fluid pressurized by the pistons 7, and a control pressure Pc of the control chamber 4 that houses the swash plate 6, to continuously change the tilt angle of the swash plate 6, and thus to change the stroke amount of the pistons 7 and to control the discharge amount of the fluid. Incidentally, for convenience of description, the capacity control valve V1 assembled into the variable displacement compressor M is not shown in FIG. 1.

Specifically, the higher the control pressure Pc in the control chamber 4 is, the smaller the tilt angle of the swash plate 6 with respect to the rotating shaft 5 is, and thus the stroke amount of the pistons 7 is reduced. When the control pressure Pc reaches a certain pressure or higher, the swash plate 6 is substantially perpendicular to the rotating shaft 5, namely, is slightly tilted from perpendicularity. At this time, since the stroke amount of the pistons 7 is minimized and the pressurization of the fluid in the cylinders 4a by the pistons 7 is minimized, the amount of discharge of the fluid to the discharge chamber 2 is reduced, and the cooling capacity of the air conditioning system is minimized. On the other hand, the lower the control pressure Pc in the control chamber 4 is, the larger the tilt angle of the swash plate 6 with respect to the rotating shaft 5 is to increase the stroke amount of the pistons 7, and when the control pressure Pc reaches a certain pressure or lower, the swash plate 6 has a maximum tilt angle with respect to the rotating shaft 5. In this case, since the stroke amount of the pistons 7 is maximized and the pressurization of the fluid in the cylinders 4a by the pistons 7 is maximized, the discharge amount of the fluid to the discharge chamber 2 is increased, and the cooling capacity of the air conditioning system is maximized.

As shown in FIG. 2, the capacity control valve V1 assembled into the variable displacement compressor M controls an electric current that energizes a coil 86 forming the solenoid 80, to perform opening and closing control of a main valve 50 and an auxiliary valve 54 in the capacity control valve V1, and performs opening and closing control of a pressure sensitive valve 53 using the suction pressure Ps and controls the fluid flowing into the control chamber 4 or flowing out from the control chamber 4, to variably control the control pressure Pc in the control chamber 4.

In the present embodiment, the main valve 50 includes a main and auxiliary valve body 51 serving as a valve body and a main valve seat 10a that is formed at an annular protrusion 10c having an isosceles trapezoidal shape in a cross-sectional view and protruding from an inner peripheral surface of a valve housing 10 to a radially inner side, and an axially left end surface 51a of the main and auxiliary valve body 51 comes into contact with and separates from the main valve seat 10a to open and close the main valve 50. The auxiliary valve 54 includes the main and auxiliary valve body 51 and an auxiliary valve seat 82a formed in an opening end surface of a fixed iron core 82, namely, in an axially left end surface of the fixed iron core 82, and a step portion 51b on an axially right side of the main and auxiliary valve body 51 comes into contact with and separates from the auxiliary valve seat 82a to open and close the auxiliary valve 54. The pressure sensitive valve 53 includes an adapter 70 of the pressure sensitive body 60 and a pressure sensitive valve seat 52a formed at an axially left end surface of a pressure sensitive valve member 52, and an axially right end surface 70a of the adapter 70 comes into contact with and separates from the pressure sensitive valve seat 52a to open and close the pressure sensitive valve 53.

Next, a structure of the capacity control valve V1 will be described. As shown in FIG. 2, the capacity control valve V1 mainly includes the valve housing 10 made of a metallic material or a resin material; the main and auxiliary valve body 51 and the pressure sensitive valve member 52 disposed inside the valve housing 10 so as to be reciprocatable in the axial direction; the pressure sensitive body 60 that applies a biasing force to the main and auxiliary valve body 51 and to the pressure sensitive valve member 52 to the right in the axial direction according to the suction pressure Ps; the solenoid 80 connected to the valve housing 10 to exert a driving force on the main and auxiliary valve body 51 and on the pressure sensitive valve member 52; and an opening and closing member 90 that is restricted in movement with respect to the valve housing 10 by a first coil spring 91 and a second coil spring 92 serving as restriction means to be described later, the restriction means being also called as a restriction device. As the main valve 50 is opened and closed, the main and auxiliary valve body 51 and the pressure sensitive valve member 52 reciprocate together in the axial direction, so that the opening and closing member 90 is reciprocatable relative to the pressure sensitive valve member 52 in the axial direction and a flow passage between an auxiliary valve chamber 30 of the suction pressure Ps and a pressure sensitive chamber 40 of the control pressure Pc is opened and closed by the relative reciprocation. Therefore, it can be said that the opening and closing member 90 forms a CS valve that rapidly releases the control pressure Pc of the control chamber 4 to the suction chamber 3 through a through-hole 52d and an intermediate communication passage 55 of the pressure sensitive valve member 52 to be described later, together with the pressure sensitive valve member 52.

As shown in FIG. 2, the solenoid 80 mainly includes a casing 81 including an opening portion 81*a* that is open to the left in the axial direction; the fixed iron core 82 having a substantially cylindrical shape being inserted into the opening portion 81*a* of the casing 81 from the left in the axial direction to be fixed to a radially inner side of the casing 81; a drive rod 83 which is reciprocatable in the axial direction on the radially inner side of the fixed iron core 82 and of which an axially left end portion is connected and fixed to the main and auxiliary valve body 51; a movable iron core 84 firmly fixed to an axially right end portion of the drive rod 83; a coil spring 85 provided between the fixed iron core 82 and the movable iron core 84 to bias the movable iron core 84 to the right in the axial direction; and a coil 86 for excitation wound on an outer side of the fixed iron core 82 with a bobbin interposed therebetween.

A recessed portion 81*b* that is recessed to the right in the axial direction is formed on a radially inner side of an axially left side of the casing 81, and an axially right end portion of the valve housing 10 is inserted and fixed to the recessed portion 81*b* in a substantially sealed state.

The fixed iron core 82 is made of a rigid body that is a magnetic material such as iron or silicon steel, and includes a cylindrical portion 82*b* which extends in the axial direction and in which an insertion hole 82*c* into which the drive rod 83 is inserted is formed, and a flange portion 82*d* having an annular shape and extending from an outer peripheral surface of an axially left end portion of the cylindrical portion 82*b* in a radially outward direction, and a recessed portion 82*e* that is recessed to the right in the axial direction is formed on a radially inner side of an axially left side of the cylindrical portion 82*b*.

As shown in FIG. 2, a Pd port 12 that is a discharge port communicating with the discharge chamber 2 of the variable displacement compressor M, a Ps port 13 that is a suction port communicating with the suction chamber 3 of the variable displacement compressor M, and a Pc port 14 that is a control port communicating with the control chamber 4 of the variable displacement compressor M are formed in the valve housing 10.

A partition adjustment member 11 is press-fitted into an axially left end portion of the valve housing 10 in a substantially sealed state, so that the valve housing 10 has a substantially bottomed cylindrical shape. Incidentally, the partition adjustment member 11 can adjust the installation position of the valve housing 10 in the axial direction to adjust a biasing force of the pressure sensitive body 60.

Inside the valve housing 10, a main valve chamber 20 which communicates with the Pd port 12 and in which an axially left end surface 51*a* side of the main and auxiliary valve body 51 is disposed, the auxiliary valve chamber 30 which communicates with the Ps port 13 and in which a back pressure side of the main and auxiliary valve body 51, namely, the step portion 51*b* on the axially right side of the main and auxiliary valve body 51 is disposed, and the pressure sensitive chamber 40 which communicates with the Pc port 14 and in which the pressure sensitive valve member 52, the opening and closing member 90, and the pressure sensitive body 60 are disposed are formed.

In addition, the main and auxiliary valve body 51 and the pressure sensitive valve member 52 inserted and fixed to the main and auxiliary valve body 51 are disposed inside the valve housing 10 so as to be reciprocatable in the axial direction, and a guide hole 10*b* which has a small diameter and with which an outer peripheral surface of the main and auxiliary valve body 51 is in slidable contact in a substantially sealed state is formed at an axially right end portion of the inner peripheral surface of the valve housing 10. Further, inside the valve housing 10, the main valve chamber 20 and the auxiliary valve chamber 30 are partitioned off by the outer peripheral surface of the main and auxiliary valve body 51 and an inner peripheral surface of the guide hole 10*b*.

Incidentally, the inner peripheral surface of the guide hole 10*b* and the outer peripheral surface of the main and auxiliary valve body 51 are slightly separated from each other in a radial direction to form a very small gap therebetween, and the main and auxiliary valve body 51 is smoothly movable relative to the valve housing 10 in the axial direction.

As shown in FIG. 2, the pressure sensitive body 60 mainly includes a bellows core 61 in which a coil spring 62 is built-in, and the adapter 70 provided at an axially right end portion of the bellows core 61, and an axially left end surface of the bellows core 61 is fixed to the partition adjustment member 11.

In addition, the pressure sensitive body 60 is disposed in the pressure sensitive chamber 40, and the axially right end surface 70*a* of the adapter 70 is seated on the pressure sensitive valve seat 52*a* of the pressure sensitive valve member 52 by a biasing force of the coil spring 62 and the bellows core 61 to move the adapter 70 to the right in the axial direction. In addition, a force to the left in the axial direction is applied to the adapter 70 according to the suction pressure Ps in the intermediate communication passage 55.

As shown in FIG. 2, the main and auxiliary valve body 51 is formed in a substantially cylindrical shape. The pressure sensitive valve member 52 that is separately formed in a flanged cylindrical shape and in a substantially turret shape in a side view is inserted and fixed to an axially left end portion of the main and auxiliary valve body 51 in a substantially sealed state, and the drive rod 83 is inserted and fixed to an axially right end portion of the main and auxiliary valve body 51 in a substantially sealed state. The main and auxiliary valve body 51, the pressure sensitive valve member 52, and the drive rod 83 are movable together in the axial direction.

In addition, since the labyrinth effect of annular grooves formed in the outer peripheral surface of the main and auxiliary valve body 51 can suppress the leakage of the fluid from the main valve chamber 20 to the auxiliary valve chamber 30, the discharge pressure Pd of the discharge fluid supplied from the discharge chamber 2 to the main valve chamber 20 via the Pd port 12 is maintained.

Incidentally, hollow holes inside the main and auxiliary valve body 51 and inside the pressure sensitive valve member 52 are connected to each other to form the intermediate communication passage 55 penetrating therethrough in the axial direction. Incidentally, the intermediate communication passage 55 communicates with the auxiliary valve chamber 30 via a plurality of through-holes 51*c* penetrating through the axially right end portion of the main and auxiliary valve body 51 in the radial direction.

Figure 3:
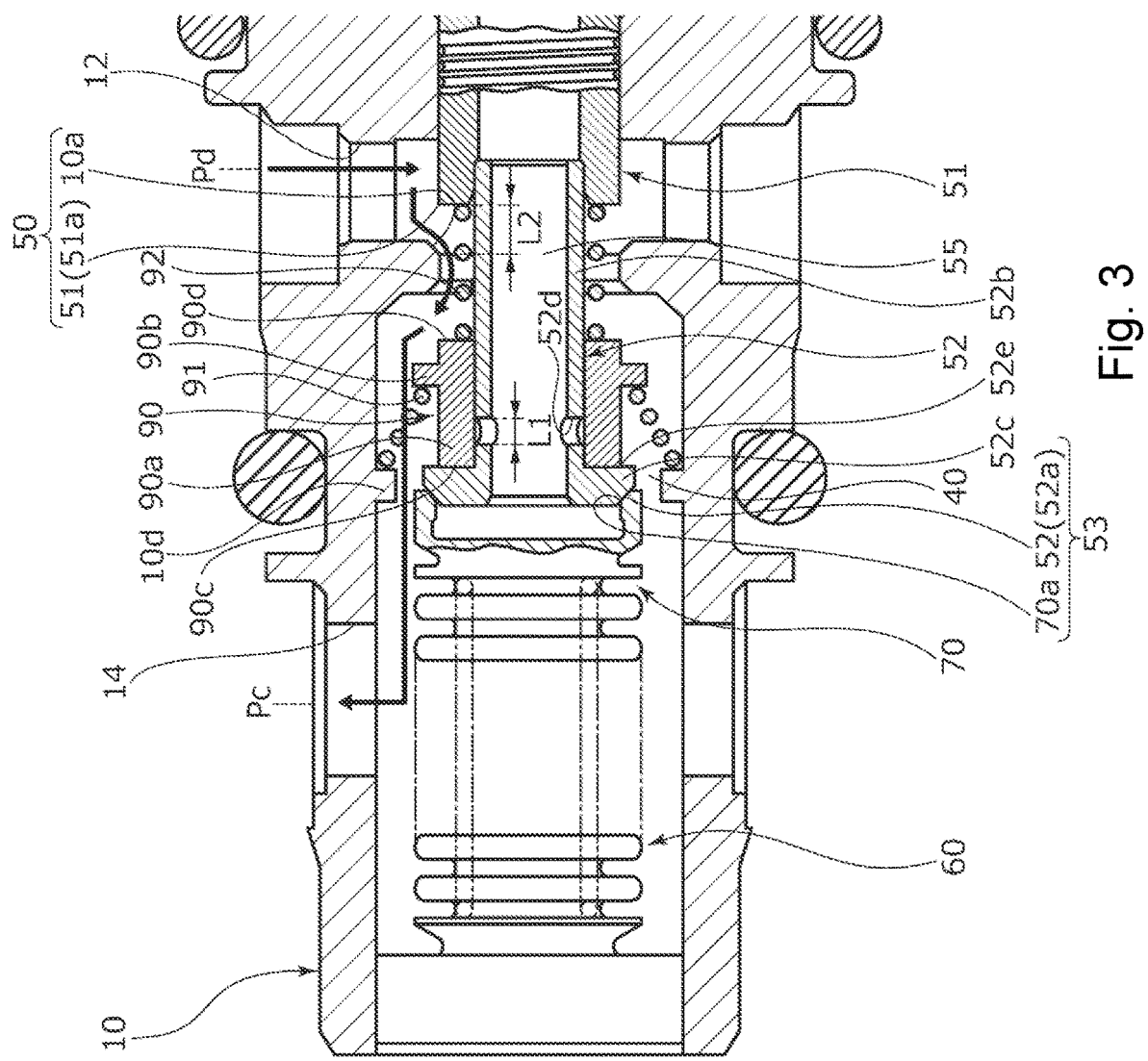
FIG. 3 is an enlarged cross-sectional view of FIG. 2.
Figure 4:
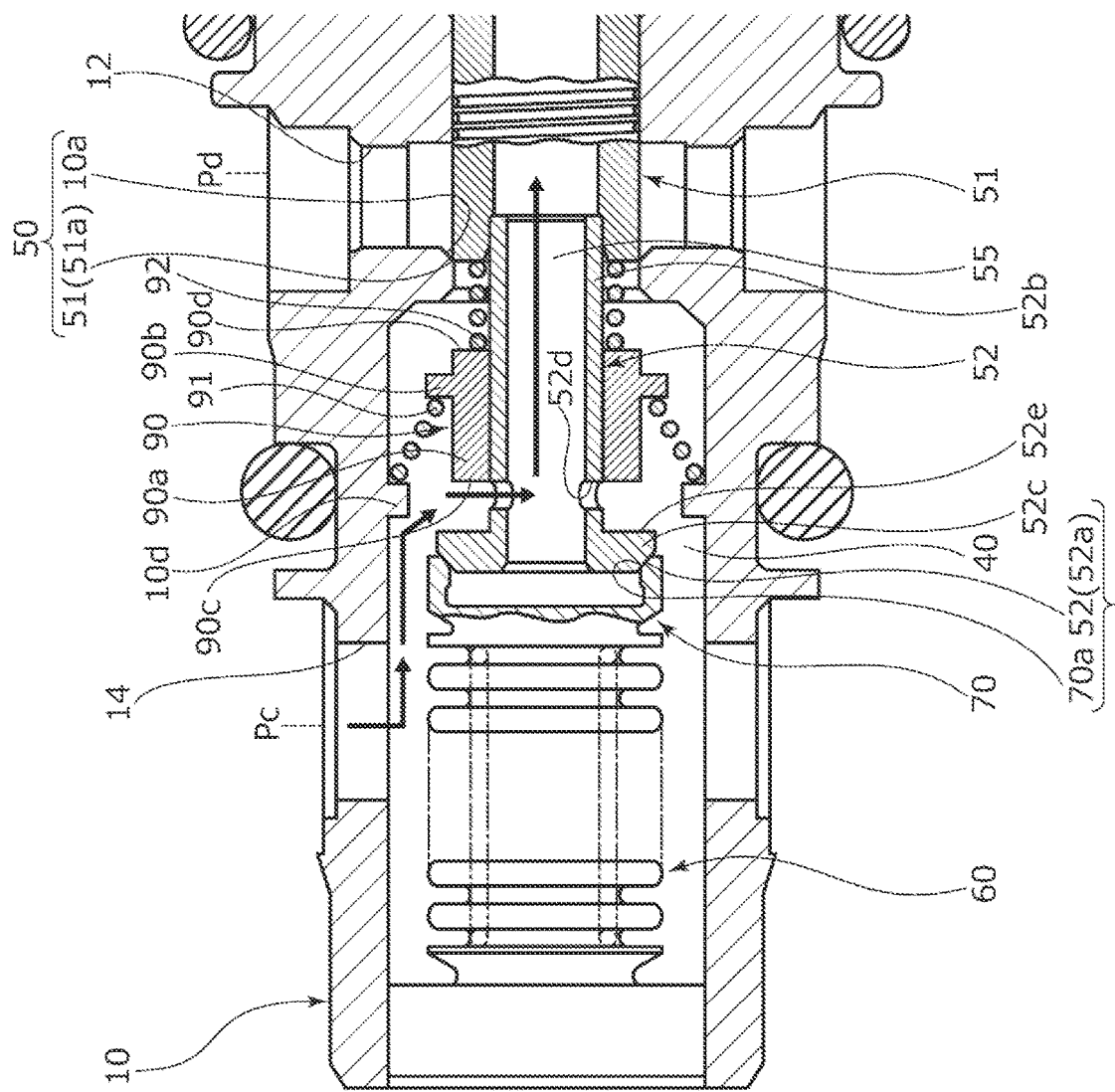
FIG. 4 is an enlarged cross-sectional view showing a state where the main valve is closed and the opening and closing member moves relative to the pressure sensitive valve member to open the through-holes of the pressure sensitive valve member in an energized state of the capacity control valve of the first embodiment.

As shown in FIGS. 2 to 4, the pressure sensitive valve member 52 is made of a metallic material or a resin material, and is formed in a flanged cylindrical shape and in a substantially turret shape in a side view that includes a base portion 52*b* having a cylindrical shape of which an axially right end portion is inserted and fixed to the main and auxiliary valve body 51 in a substantially sealed state and to which the opening and closing member 90 and the second coil spring 92 are externally fitted, and a flange portion 52c which extends from an outer peripheral surface of an axially left end portion of the base portion 52b in the radially outward direction and in which the pressure sensitive valve seat 52a that comes into contact with and separates from the axially right end surface 70a of the adapter 70 is formed. Incidentally, a plurality of the through-holes 52d penetrating through the base portion 52b in the radial direction and communicating with the intermediate communication passage 55 are formed at the axially left end portion of the base portion 52b.

As shown in FIGS. 2 to 4, the opening and closing member 90 is formed as a member separate from the pressure sensitive valve member 52, and includes a base portion 90a having a cylindrical shape as an annular portion that is externally fitted to the base portion 52b of the pressure sensitive valve member 52, and a protrusion portion 90b having an annular shape and protruding from an outer peripheral surface of an axially right end portion of the base portion 90a to a radially outer side. Incidentally, the protrusion portion 90b is not limited to being formed in an annular shape, and a plurality of the projections may be disposed apart from each other in a circumferential direction.

In addition, an inner peripheral surface of the base portion 90a of the opening and closing member 90 is slidable on an outer peripheral surface of the base portion 52b of the pressure sensitive valve member 52. In detail, the inner peripheral surface of the base portion 90a of the opening and closing member 90 and the outer peripheral surface of the base portion 52b of the pressure sensitive valve member 52 are slightly separated from each other in the radial direction to form a very small gap, and the opening and closing member 90 is smoothly movable relative to the pressure sensitive valve member 52 in the axial direction.

In addition, the opening and closing member 90 is restricted in movement with respect to the valve housing 10 by the first coil spring 91 and the second coil spring 92 that are elastic bodies as restriction means.

In detail, the first coil spring 91 is externally fitted to the opening and closing member 90, and an axially left end surface of the first coil spring 91 is in contact with a side surface on an axially right side of an annular receiving portion 10d having a rectangular shape in a cross-sectional view and protruding from the inner peripheral surface of the valve housing 10 in the pressure sensitive chamber 40 to the radially inner side, and an axially right end surface of the first coil spring 91 is in contact with a side surface on an axially left side of the protrusion portion 90b of the opening and closing member 90, to bias the opening and closing member 90 to the right in the axial direction that is an opening direction where the through-holes 52d of the pressure sensitive valve member 52 are opened. In addition, since the first coil spring 91 is a compression spring, and is formed of a conical coil spring, even when the opening and closing member 90 is tilted or offset, and the first coil spring 91 is deformed in the radial direction, the first coil spring 91 is unlikely to interfere with internal and external components, and can be stably held.

In addition, the second coil spring 92 is externally fitted to the base portion 52b of the pressure sensitive valve member 52 on an axially right side of the opening and closing member 90, and an axially left end surface of the second coil spring 92 is in contact with an end surface 90d on an axially right side of the base portion 90a of the opening and closing member 90, and an axially right end surface of the second coil spring 92 is in contact with a radially inner portion of the axially left end surface of the main and auxiliary valve body 51, to bias the opening and closing member 90 to the left in the axial direction that is a closing direction where the through-holes 52d of the pressure sensitive valve member 52 are closed. In addition, the second coil spring 92 is a compression spring, and is formed of a constant pitch coil spring. As described above, since the second coil spring 92 is externally fitted to the base portion 52b of the pressure sensitive valve member 52, and is guided by the base portion 52b of the pressure sensitive valve member 52, the second coil spring 92 is unlikely to be moved or deformed in the radial direction.

The restriction means in the first embodiment includes the first coil spring 91 and the second coil spring 92 as a pair of springs that press the opening and closing member 90 in the opening direction and in the closing direction, respectively. Incidentally, a set load of the first coil spring 91 is larger than a maximum spring load of the second coil spring 92.

In addition, an end surface 90c on an axially left side of the base portion 90a of the opening and closing member 90 is in contact with a side surface 52e on an axially right side of the flange portion 52c of the pressure sensitive valve member 52 when the through-holes 52d of the pressure sensitive valve member 52 are closed, in which the opening and closing member 90 is moved to the left in the axial direction relative to the pressure sensitive valve member 52 (refer to FIGS. 2 and 3). Accordingly, an axial position of the opening and closing member 90 when the through-holes 52d of the pressure sensitive valve member 52 are closed by the opening and closing member 90 is determined.

Further, when the through-holes 52d of the pressure sensitive valve member 52 are closed, the end surface 90c of the base portion 90a of the opening and closing member 90 is pressed toward the side surface 52e of the flange portion 52c of the pressure sensitive valve member 52 by a biasing force of the second coil spring 92. At this time, a spring load of the second coil spring 92 acts on the first coil spring 91 via the protrusion portion 90b of the opening and closing member 90, but as described above, since the set load of the first coil spring 91 is larger than the maximum spring load of the second coil spring 92, the first coil spring 91 is not contracted, and the state of a set length (attachment length) is maintained.

Incidentally, the through-holes 52d of the pressure sensitive valve member 52 are formed on an axially right side of the side surface 52e on the axially right side of the flange portion 52c, and until the end surface 90c of the base portion 90a of the opening and closing member 90 moves to the axial position of axially left opening ends of the through-holes 52d relative to the pressure sensitive valve member 52 from a state where the end surface 90c is pressed against the side surface 52e of the flange portion 52c of the pressure sensitive valve member 52, a state where the opening and closing member 90 overlaps the through-holes 52d in the radial direction to close the through-holes 52d is maintained.

In addition, as shown in FIG. 3, a dimension L1 of the through-hole 52d of the pressure sensitive valve member 52 in the axial direction is equal to or less than a maximum stroke amount L2 of the main and auxiliary valve body 51 (L1 L2).

Next, operation of the capacity control valve V1, mainly operation of an opening and closing mechanism of the through-holes 52d of the pressure sensitive valve member 52 performed by the opening and closing member 90 will be described in order of during normal control and at a start-up.

First, operation during normal control will be described. During normal control, the opening degree or the opening time of the main valve 50 is adjusted by duty control of the capacity control valve V1, to control the flow rate of the fluid from the Pd port 12 to the Pc port 14. At this time, with respect to the reciprocation of the main and auxiliary valve body 51 in the axial direction, the first coil spring 91 is not extended and contracted, and only the second coil spring 92 is extended and contracted, so that the opening and closing member 90 is restricted in movement with respect to the valve housing 10.

In detail, during normal control of the first embodiment, by duty control of the capacity control valve V1, the stroke of the main and auxiliary valve body 51 to adjust the opening degree of the main valve 50 is controlled within a range until the end surface 90c of the base portion 90a of the opening and closing member 90 moves to the axial position of the axially left opening ends of the through-holes 52d relative to the pressure sensitive valve member 52 from a state where the end surface 90c is in contact with and pressed against the side surface 52e of the flange portion 52c of the pressure sensitive valve member 52 (refer to FIG. 3) when the main valve 50 is fully opened, so that a state where the opening and closing member 90 overlaps the through-hole 52d in the radial direction to close the through-holes 52d is maintained.

As described above, during normal control, when the opening and closing member 90 closes the through-holes 52d of the pressure sensitive valve member 52, since a flow passage leading from the control chamber 4 to the suction chamber 3 through the Pc port 14, then through the pressure sensitive chamber 40, then through the through-holes 52d, then through the intermediate communication passage 55, then through the auxiliary valve chamber 30, and then through the Ps port 13 is not formed, the rate of outflow of the refrigerant from the control chamber 4 to the suction chamber 3 is reduced, so that the operating efficiency of the variable displacement compressor M can be improved.

Next, operation at a start-up will be described. After the variable displacement compressor M is left without being used for a long time, the discharge pressure Pd, the control pressure Pc, and the suction pressure Ps are substantially in equilibrium. Incidentally, although not shown for convenience of description, the fluid of high pressure in the control chamber 4 may be liquefied when the variable displacement compressor M is left in a stopped state for a long time, and at this time, due to the high suction pressure Ps in the intermediate communication passage 55, the pressure sensitive body 60 is contracted and actuated to separate the axially right end surface 70a of the adapter 70 from the pressure sensitive valve seat 52a of the pressure sensitive valve member 52, so that the pressure sensitive valve 53 is opened. As described above, for example, when the suction pressure Ps is high at a start-up, the liquid refrigerant in the control chamber 4 can be discharged to the suction chamber 3 via the intermediate communication passage 55 in a short time by opening of the pressure sensitive valve 53.

In a non-energized state of the capacity control valve V1, the movable iron core 84 is pressed to the right in the axial direction by a biasing force of the coil spring 85 forming the solenoid 80 or by the biasing force of the coil spring 62 and of the bellows core 61 that form the pressure sensitive body 60, so that the drive rod 83, the main and auxiliary valve body 51, and the pressure sensitive valve member 52 move to the right in the axial direction, the step portion 51b on the axially right side of the main and auxiliary valve body 51 is seated on the auxiliary valve seat 82a of the fixed iron core 82 to close the auxiliary valve 54, and the axially left end surface 51a of the main and auxiliary valve body 51 separates from the main valve seat 10a formed in the inner peripheral surface of the valve housing 10, to open the main valve 50 (refer to FIGS. 2 and 3). At this time, as described above, the opening and closing member 90 is located on an axially left side relative to the pressure sensitive valve member 52 due to the biasing force of the second coil spring 92, to close the through-holes 52d of the pressure sensitive valve member 52.

Due to electromagnetic force generated by the application of an electric current to the solenoid 80 when the variable displacement compressor M is started up and the capacity control valve V1 is energized, the movable iron core 84 is pulled to the left in the axial direction toward the fixed iron core 82, the drive rod 83 fixed to the movable iron core 84, the main and auxiliary valve body 51, and the pressure sensitive valve member 52 move together to the left in the axial direction, and the pressure sensitive body 60 is pressed and contracted to the left in the axial direction, so that the step portion 51b on the axially right side of the main and auxiliary valve body 51 separates from the auxiliary valve seat 82a to open the auxiliary valve 54, and the axially left end surface 51a of the main and auxiliary valve body 51 is seated on the main valve seat 10a to close the main valve 50 (refer to FIG. 4). At this time, with respect to the movement of the main and auxiliary valve body 51 to the left in the axial direction, the first coil spring 91 is not contracted, and only the second coil spring 92 is contracted, so that the opening and closing member 90 is restricted in movement with respect to the valve housing 10, and moves to the right in the axial direction relative to the pressure sensitive valve member 52, to open the through-holes 52d of the pressure sensitive valve member 52.

As described above, when the opening and closing member 90 opens the through-holes 52d of the pressure sensitive valve member 52 at a start-up, the pressure sensitive chamber 40 communicates with the intermediate communication passage 55 via the through-holes 52d and the fluid flows (shown by solid arrows in FIG. 4). Namely, since the opening and closing member 90 opens the through-holes 52d of the pressure sensitive valve member 52 to form a flow passage for the discharge of the fluid in order of the control chamber 4, the Pc port 14, the pressure sensitive chamber 40, the through-holes 52d, the intermediate communication passage 55, the auxiliary valve chamber 30, the Ps port 13, and the suction chamber 3, the liquefied fluid of the control chamber 4 can be discharged in a short time to improve responsiveness at a start-up. In addition, for example, as described above, even when the pressure sensitive valve 53 is not opened by the suction pressure Ps at a start-up, the opening and closing member 90 can open the through-holes 52d of the pressure sensitive valve member 52 to form a flow passage for the discharge of the fluid from the control chamber 4 to the suction chamber 3 via the intermediate communication passage 55.

In addition, when the variable displacement compressor M is driven at the maximum capacity, the capacity control valve V1 is energized at a maximum duty, so that the main valve 50 is closed and the opening and closing member 90 is moved to the right in the axial direction relative to the pressure sensitive valve member 52 to open the through-holes 52d of the pressure sensitive valve member 52, and to allow communication between the Pc port 14 and the Ps port 13. Therefore, the control pressure Pc can be quickly lowered. For this reason, the pistons 7 in the cylinders 4a of the control chamber 4 can be quickly variable, and the state of the maximum capacity can be maintained to improve the operating efficiency.

As described above, during normal control of the capacity control valve V1, the through-holes 52d of the pressure sensitive valve member 52 are closed, and at a start-up and during a maximum capacity operation, the opening and closing member 90 is moved relative to the pressure sensitive valve member 52 to open the through-holes 52d of the pressure sensitive valve member 52, so that the operating efficiency of the variable displacement compressor M can be improved.

In addition, in the first embodiment, the opening and closing member 90 is restricted in movement with respect to the valve housing 10 by the first coil spring 91 and the second coil spring 92 that are elastic bodies as restriction means. Accordingly, for example, the set load of the first coil spring 91 of the first embodiment is larger than the maximum spring load of the second coil spring 92, and the first coil spring 91 is not contracted in a normal situation, but when an excessive force acts to move the opening and closing member 90 to the left in the axial direction in an abnormal situation, the first coil spring 91 is contracted to allow the movement of the opening and closing member 90 to the left in the axial direction, and to be able to restrict the movement of the opening and closing member 90 with respect to the valve housing 10 within a predetermined range, so that damage to the opening and closing member 90 can be prevented.

In addition, the restriction means in the first embodiment includes the first coil spring 91 and the second coil spring 92 as a pair of springs that press the opening and closing member 90 in the opening direction and in the closing direction, respectively. Accordingly, the timing when the through-holes 52d of the pressure sensitive valve member 52 are opened and closed by the opening and closing member 90 can be adjusted by a difference in spring constant between the first coil spring 91 and the second coil spring 92. A specific example of this case will be described in detail in a second embodiment.

In addition, the first coil spring 91 as restriction means is formed of a conical coil spring, and the second coil spring 92 is formed of a constant pitch coil spring that is externally fitted to the base portion 52b of the pressure sensitive valve member 52. Accordingly, since the movement of each of the first coil spring 91 and the second coil spring 92 in the radial direction is restricted, the tilting of the opening and closing member 90 pressed from both axial sides by the first coil spring 91 and the second coil spring 92 can be suppressed, and the opening and closing member 90 is smoothly slidable with respect to the pressure sensitive valve member 52.

In addition, it is preferable that the opening and closing member 90 and the pressure sensitive valve member 52 are made of different materials, and the frictional resistance is reduced, so that the pressure sensitive valve member 52 is smoothly slidable with respect to the opening and closing member 90.

In addition, since the end surface 90c of the base portion 90a of the opening and closing member 90 is pressed toward the side surface 52e of the flange portion 52c of the pressure sensitive valve member 52 by the biasing force of the second coil spring 92, while positioning a closed position of the opening and closing member 90, it is possible to prevent the end surface 90c of the base portion 90a of the opening and closing member 90 from immediately separating from the side surface 52e of the flange portion 52c of the pressure sensitive valve member 52 for an initial movement of the pressure sensitive valve member 52, and it is possible to secure a closed state of the through-holes 52d of the pressure sensitive valve member 52 using the opening and closing member 90.

In addition, the dimension L1 of the through-hole 52d of the pressure sensitive valve member 52 in the axial direction is equal to or less than the maximum stroke amount L2 of the main and auxiliary valve body 51 (L1 L2), and a dimension from the side surface 52e of the flange portion 52c of the pressure sensitive valve member 52 to an axially right opening end of the through-hole 52d is substantially the same as the maximum stroke amount L2 of the main and auxiliary valve body 51. Accordingly, since the opening and closing member 90 can be moved to the right in the axial direction relative to the pressure sensitive valve member 52 to fully open the through-holes 52d of the pressure sensitive valve member 52, a wide cross-sectional area of the flow passage for the discharge of the fluid from the Pc port 14 to the suction chamber 3 can be secured.

In addition, since the plurality of through-holes 52d of the pressure sensitive valve member 52 are formed, a wide cross-sectional area of the flow passage for the discharge of the fluid from the Pc port 14 to the suction chamber 3 can be secured. In addition, since the plurality of through-holes 52d are evenly disposed in the circumferential direction, the stroke of the opening and closing member 90 relative to the pressure sensitive valve member 52 can be shortened.

In addition, since the opening and closing member 90 includes the base portion 90a as an annular portion that is externally fitted to the base portion 52b of the pressure sensitive valve member 52 and that is slidable relative to the pressure sensitive valve member 52, and the base portion 90a is continuous in the circumferential direction without interruption, the through-holes 52d of the pressure sensitive valve member 52 can be reliably closed by the base portion 90a.

In addition, in a state where the opening and closing member 90 of the first embodiment closes the through-holes 52d of the pressure sensitive valve member 52, the axially left end portion of the base portion 90a extends to the left in the axial direction from the axially left opening ends of the through-holes 52d of the pressure sensitive valve member 52. Accordingly, until the opening and closing member 90 slides to the right in the axial direction relative to the pressure sensitive valve member 52 by a predetermined distance or more from a state where the end surface 90c on the axially left side of the base portion 90a is in contact with the side surface 52e of the flange portion 52c of the pressure sensitive valve member 52, since a state where the through-holes 52d of the pressure sensitive valve member 52 are closed can be maintained, even when the opening and closing member 90 slightly slides due to disturbance such as vibration, the state where the through-holes 52d of the pressure sensitive valve member 52 are closed is maintained. For this reason, the capacity control valve V1 is resistant to disturbance, and has good control accuracy.

Incidentally, the formation position of the through-holes 52d in the axial direction with respect to the side surface 52e of the flange portion 52c or the dimension of the through-hole 52d in the axial direction in the pressure sensitive valve member 52 may be adjusted to adjust the timing when the through-holes 52d of the pressure sensitive valve member 52 are opened and closed by the opening and closing member 90.

Second Embodiment

A capacity control valve according to a second embodiment of the present invention will be described with reference to FIGS. 5 to 7. Incidentally, a description of duplicated configurations that are the same as the configurations of the first embodiment will be omitted.

Figure 5:
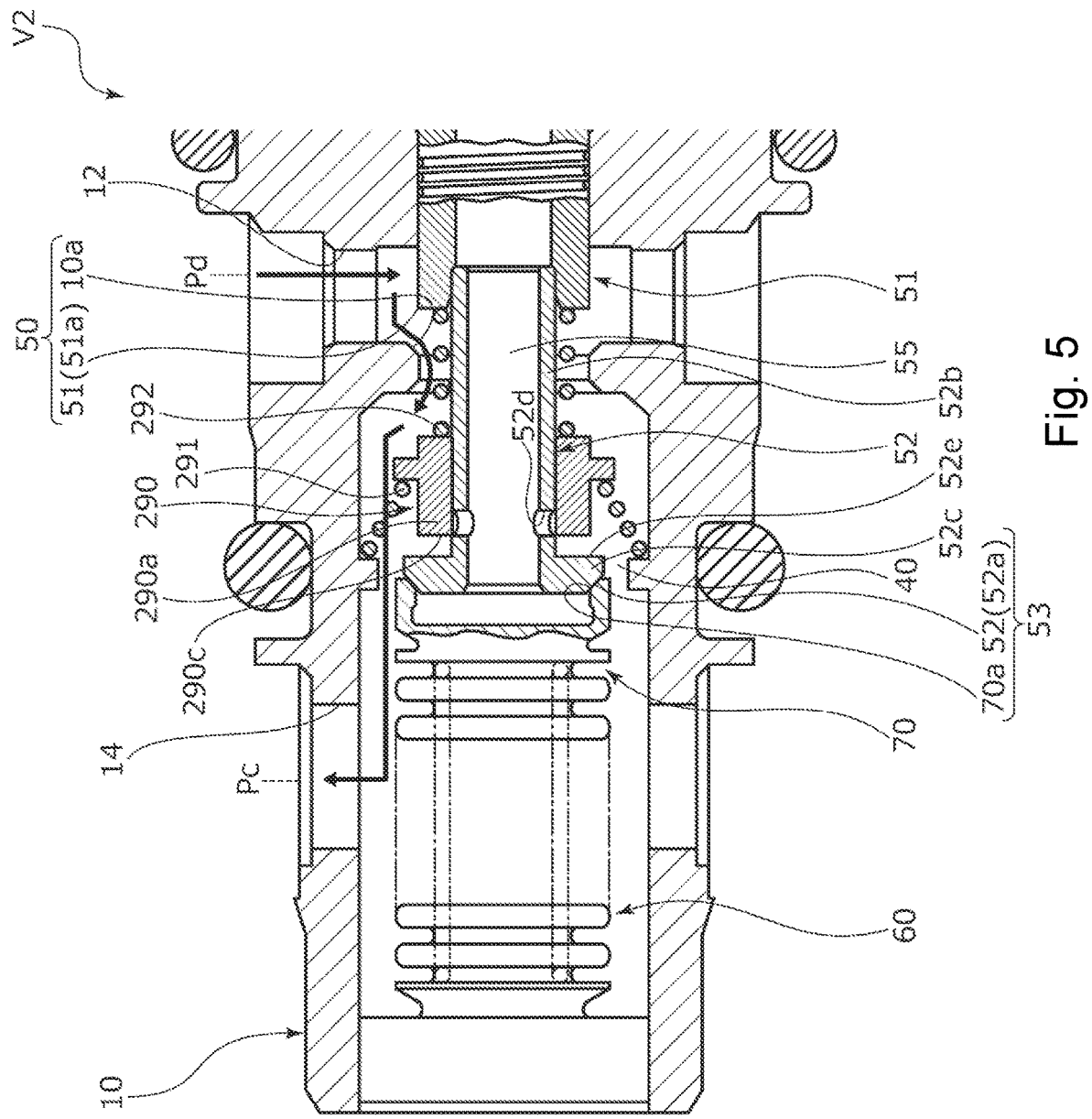
FIG. 5 is a cross-sectional view showing a state where a main valve is opened and through-holes of a pressure sensitive valve member are closed by an opening and closing member in a non-energized state of a capacity control valve according to a second embodiment of the present invention.

As shown in FIG. 5, in a capacity control valve V2 of the second embodiment, when the through-holes 52d of the pressure sensitive valve member 52 are closed, a side surface 290c on an axially left side of a base portion 290a of an opening and closing member 290 is separated from the side surface 52e of the flange portion 52c of the pressure sensitive valve member 52 to the right in the axial direction to be disposed at the axial position of the axially left opening ends of the through-holes 52d.

In addition, a spring constant k3 of a first coil spring 291 that is an elastic body as restriction means in the second embodiment is larger than a spring constant k2 of a second coil spring 292 that is an elastic body as the same restriction means, and is smaller than a spring constant k1 of the first coil spring 91 of the first embodiment (i.e., k1>k3>k2). In addition, a set load of the first coil spring 291 is smaller than a spring load of the second coil spring 292 when the main valve 50 is opened, and a maximum spring load of the first coil spring 291 is larger than a maximum spring load of the second coil spring 292.

Accordingly, during normal control of the capacity control valve V2, particularly in an initial movement where the main and auxiliary valve body 51 moves from a valve open position of the main valve 50 to the left in the axial direction, the first coil spring 291 and the second coil spring 292 are contracted together, so that the opening and closing member 290 follows the pressure sensitive valve member 52. Then, as the main and auxiliary valve body 51 is stroked to the left in the axial direction, the loads of the first coil spring 291 and the second coil spring 292 increase, and when the spring load of the first coil spring 291 exceeds the spring load of the second coil spring 292, the first coil spring 291 does not become contracted, and the opening and closing member 290 starts moving with respect to the valve housing 10.

Figure 6:
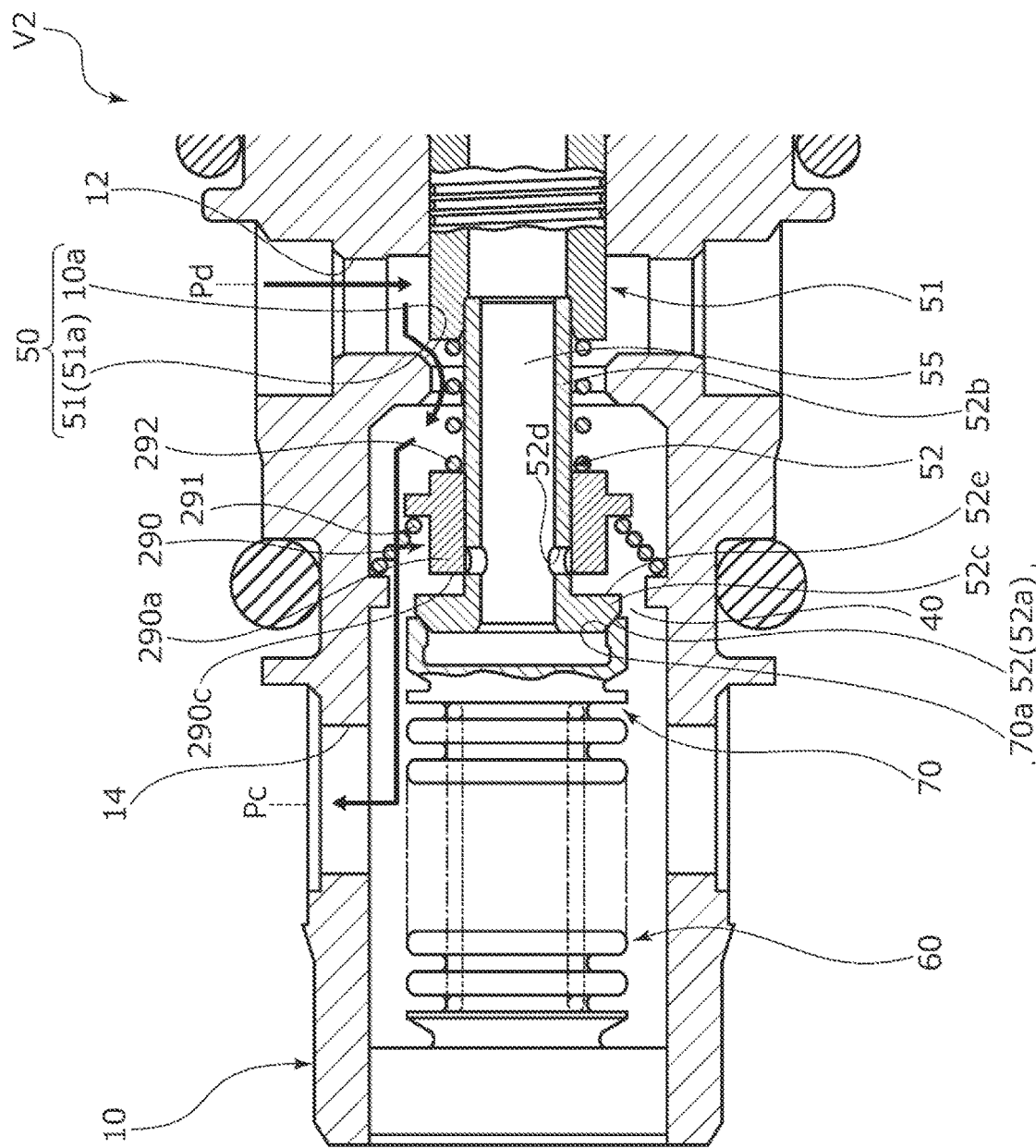
FIG. 6 is a cross-sectional view showing a state where the opening and closing member follows the pressure sensitive valve member and the through-holes of the pressure sensitive valve member are closed by the opening and closing member in an energized state of the capacity control valve of the second embodiment, particularly in an initial movement of a main and auxiliary valve body.
Figure 7:
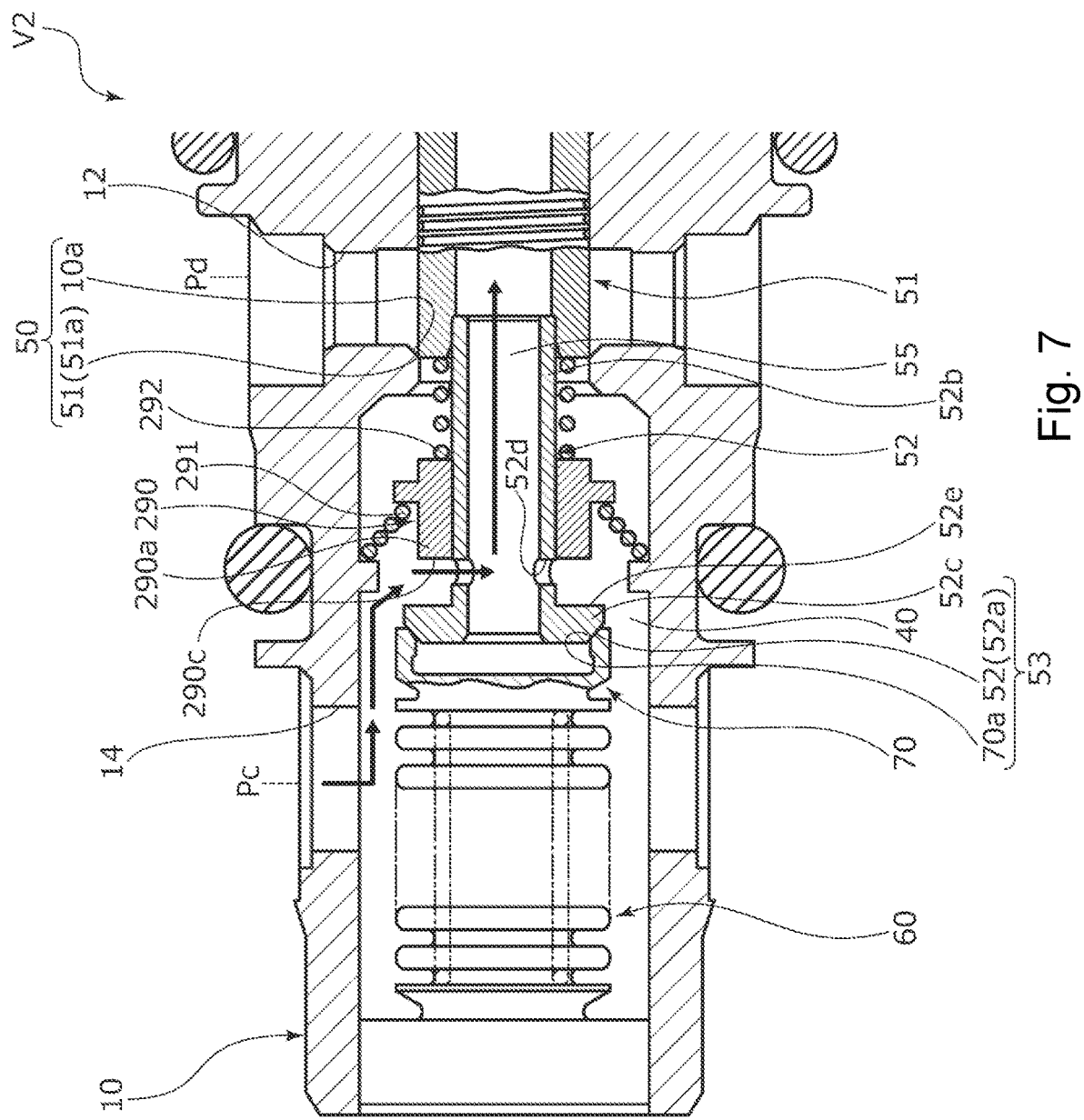
FIG. 7 is an enlarged cross-sectional view showing a state where the main valve is closed and the opening and closing member moves relative to the pressure sensitive valve member to open the through-holes of the pressure sensitive valve member in an energized state of the capacity control valve of the second embodiment.

In detail, during normal control, by duty control of the capacity control valve V2, the stroke of the main and auxiliary valve body 51 to adjust the opening degree of the main valve 50 is controlled within a range until the main and auxiliary valve body 51 moves, relative to the opening and closing member 290, to an axial position where the spring load of the first coil spring 291 exceeds the spring load of the second coil spring 292, from when the main valve 50 is fully opened (refer to FIG. 5), so that a state where the opening and closing member 290 overlaps the through-holes 52d in the radial direction to close the through-holes 52d is maintained (refer to FIG. 6).

In addition, at a start-up of and during a maximum capacity operation of the capacity control valve V2, with respect to the movement of the main and auxiliary valve body 51 to the left in the axial direction, the spring load of the first coil spring 291 exceeds the spring load of the second coil spring 292, the first coil spring 291 is not contracted, and only the second coil spring 292 is contracted, so that the opening and closing member 290 is restricted in movement with respect to the valve housing 10, and moves to the right in the axial direction relative to the pressure sensitive valve member 52, to open the through-holes 52d of the pressure sensitive valve member 52.

Accordingly, during normal control of the capacity control valve V2, the through-holes 52d of the pressure sensitive valve member 52 are closed, and at a start-up and during a maximum capacity operation, the opening and closing member 290 is moved relative to the pressure sensitive valve member 52 to open the through-holes 52d of the pressure sensitive valve member 52, so that the operating efficiency of the variable displacement compressor M can be improved.

In addition, since the first coil spring 291 is formed of a conical coil spring, and has a non-linear characteristic, the load balance between the first coil spring 291 and the second coil spring 292 as a pair of springs can be adjusted to freely adjust the timing when the through-holes 52d of the pressure sensitive valve member 52 are opened and closed by the opening and closing member 290.

Incidentally, when the through-holes 52d of the pressure sensitive valve member 52 are closed, the side surface 290c of the base portion 290a is in contact with the side surface 52e of the flange portion 52c of the pressure sensitive valve member 52, so that a state where the through-holes 52d of the pressure sensitive valve member 52 are closed may be able to be reliably maintained until the opening and closing member 290 slides to the right in the axial direction relative to the pressure sensitive valve member 52 by a predetermined distance or more.

Third Embodiment

A capacity control valve according to a third embodiment of the present invention will be described with reference to FIGS. 8 and 9. Incidentally, a description of duplicated configurations that are the same as the configurations of the first embodiment will be omitted.

Figure 8:
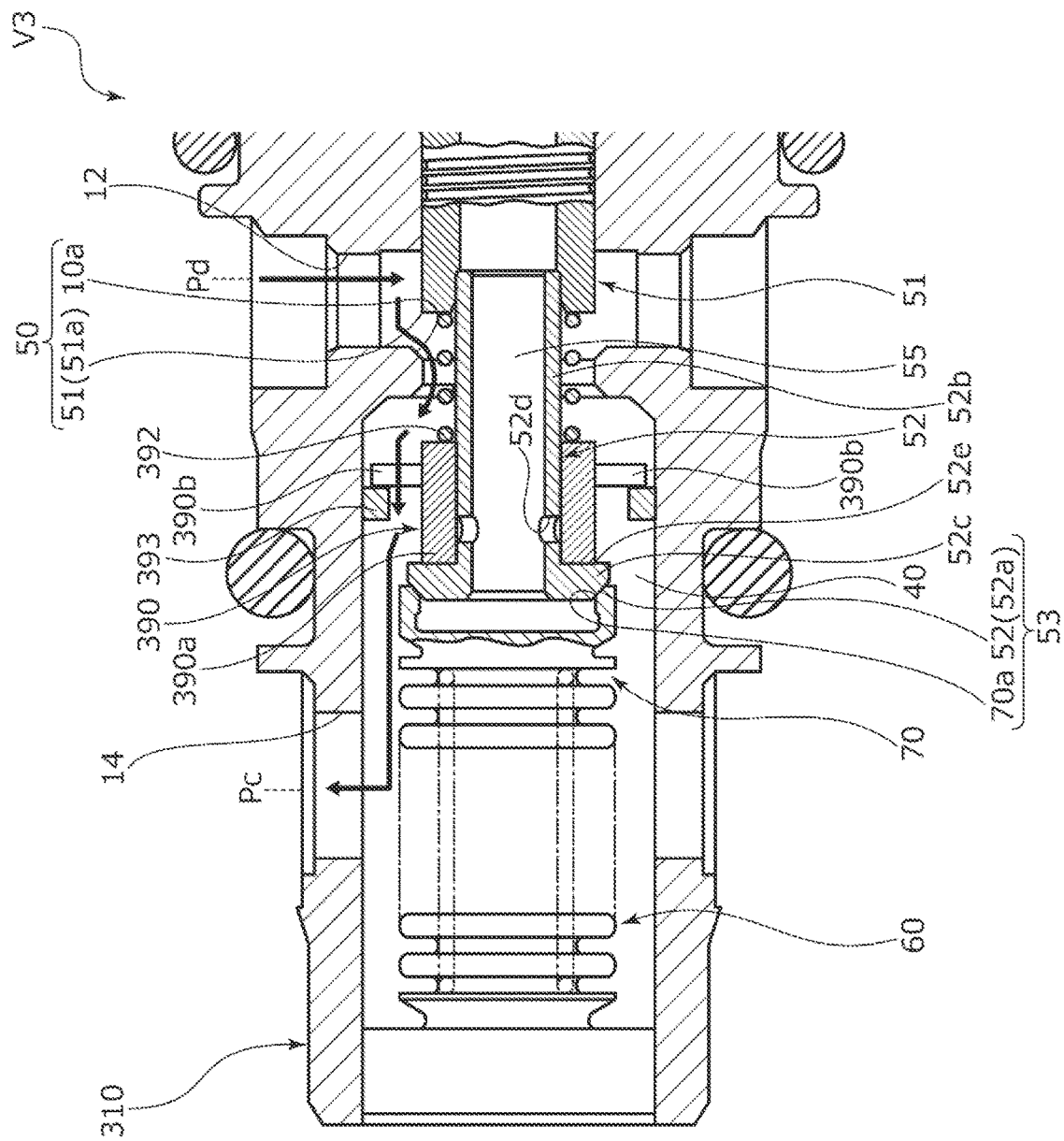
FIG. 8 is a cross-sectional view showing a state where a main valve is opened and through-holes of a pressure sensitive valve member are closed by an opening and closing member in a non-energized state of a capacity control valve according to a third embodiment of the present invention.
Figure 9:
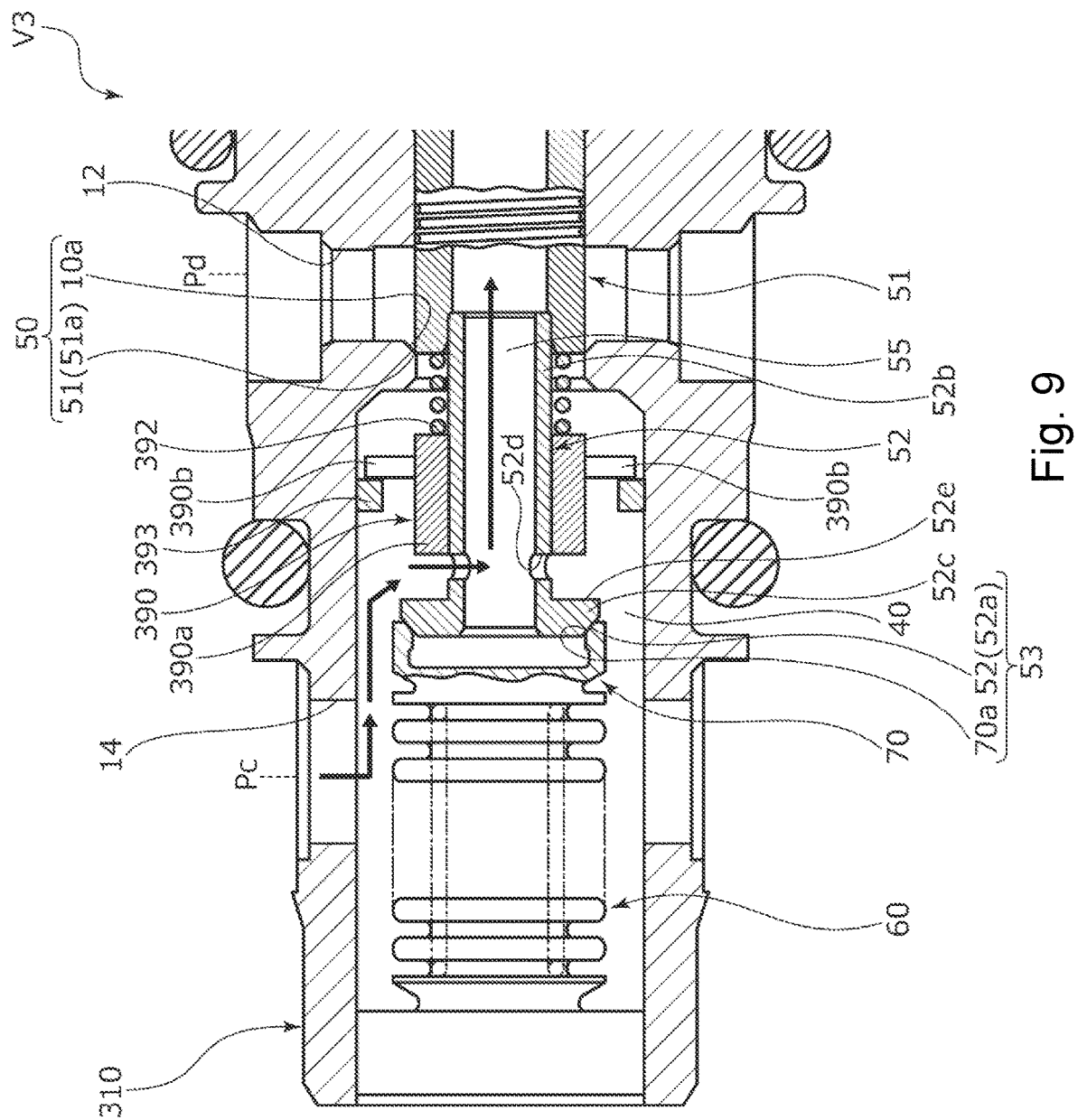
FIG. 9 is an enlarged cross-sectional view showing a state where the main valve is closed and the opening and closing member moves relative to the pressure sensitive valve member to open the through-holes of the pressure sensitive valve member in an energized state of the capacity control valve of the third embodiment.

As shown in FIGS. 8 and 9, in a capacity control valve V3 of the third embodiment, in a state where a side surface on an axially left side of a protrusion portion 390b is in contact with a stopper 393 having an annular shape as restriction means that is press-fitted and fixed to an inner peripheral surface of a valve housing 310 in the pressure sensitive chamber 40, an opening and closing member 390 is pressed to the left in the axial direction toward the stopper 393 by a coil spring 392 that is an elastic body as restriction means, so that the opening and closing member 390 is restricted in movement with respect to the valve housing 310.

In addition, the protrusion portion 390b is configured such that a plurality of projections are evenly disposed on an outer periphery of a base portion 390a having a cylindrical shape as an annular portion so as to be apart from each other in the circumferential direction, and a flow of the fluid is maintained which flows from the Pd port 12 to the Pc port 14 through gaps between the projections forming the protrusion portion 390b due to opening of the main valve 50 when the main valve 50 is controlled in an energized state (refer to FIG. 8). Incidentally, the projections may not be evenly disposed as long as the plurality of projections are disposed in the circumferential direction.

Accordingly, by changing the contact position of the stopper 393 with respect to the opening and closing member 390, it is possible to change the opening start position or the opening amount of the through-holes 52d of the pressure sensitive valve member 52 set by the opening and closing member 390 during stroke of the main and auxiliary valve body 51, and the setting of the opening start position or the opening amount is facilitated.

Incidentally, the protrusion portion 390b of the opening and closing member 390 may be formed in an annular shape, but in this case, in order to maintain a flow of the fluid flowing from the Pd port 12 to the Pc port 14, through-holes penetrating through the protrusion portion in the axial direction may be provided on a radially inner side of the stopper 393.

Fourth Embodiment

A capacity control valve according to a fourth embodiment of the present invention will be described with reference to FIGS. 10 and 11. Incidentally, a description of duplicated configurations that are the same as the configurations of the first embodiment will be omitted.

Figure 10:
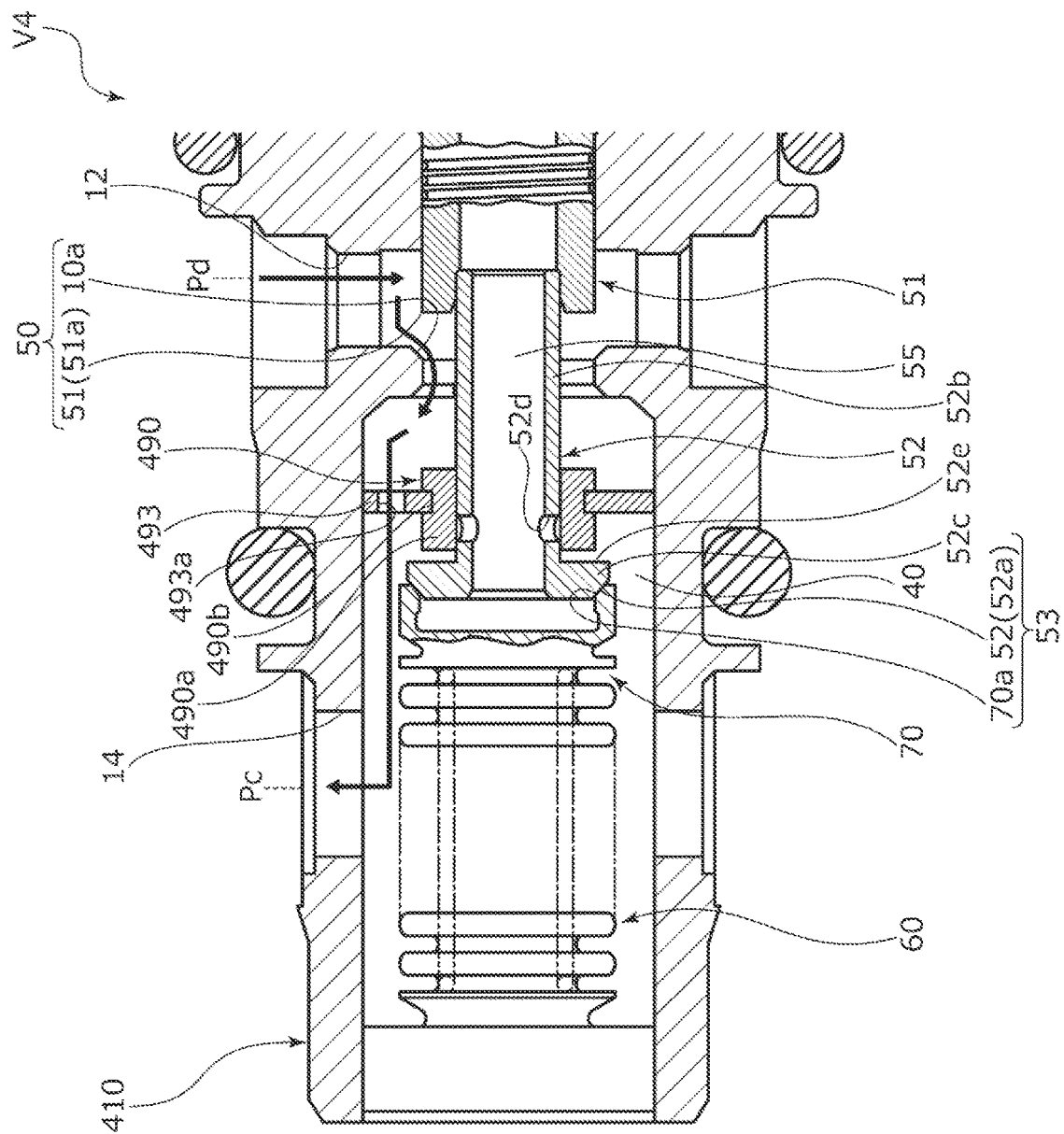
FIG. 10 is a cross-sectional view showing a state where a main valve is opened and through-holes of a pressure sensitive valve member are closed by an opening and closing member in a non-energized state of a capacity control valve according to a fourth embodiment of the present invention.
Figure 11:
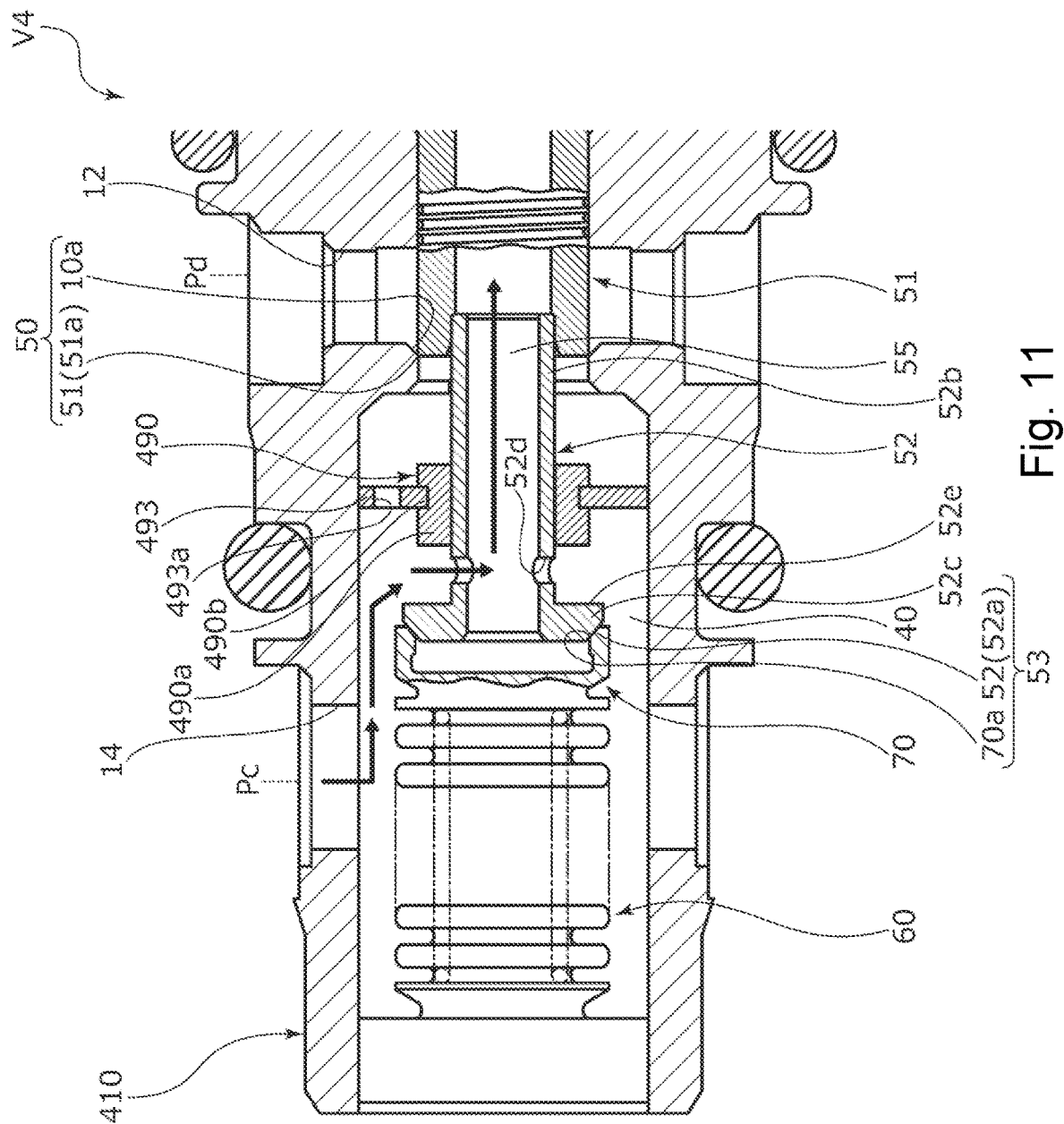
FIG. 11 is an enlarged cross-sectional view showing a state where the main valve is closed and the opening and closing member moves relative to the pressure sensitive valve member to open the through-holes of the pressure sensitive valve member in an energized state of the capacity control valve of the fourth embodiment.

As shown in FIGS. 10 and 11, in a capacity control valve V4 of the fourth embodiment, an opening and closing member 490 includes a base portion 490a having a cylindrical shape as an annular portion that is externally fitted to the base portion 52b of the pressure sensitive valve member 52, and a groove 490b extending in the circumferential direction is formed in an outer peripheral surface of the base portion 490a. A fixing member 493 having a substantially C shape as restriction means is inserted and fixed to the groove 490b. Incidentally, a plurality of through-holes 493a penetrating through the fixing member 493 in the axial direction are evenly disposed in the fixing member 493 in the circumferential direction. In addition, the through-holes 493a may not be evenly disposed.

The opening and closing member 490 is press-fitted and fixed into the pressure sensitive chamber 40 of a valve housing 410 in a state where the fixing member 493 is inserted and fixed, so that the opening and closing member 490 is restricted in movement with respect to the valve housing 410.

Accordingly, since the opening and closing member 490 is restricted in movement with respect to the valve housing 410 by fixing using the fixing member 493, a spring or the like is not required for the restriction means, and the structure can be simplified.

In addition, since the through-holes 493a providing communication between the Pd port 12 and the Pc port 14 are formed in the fixing member 493, a flow of the fluid is maintained which flows from the Pd port 12 to the Pc port 14 not only through a gap in the circumferential direction between both end portions of the fixing member 493 having a substantially C shape but also through the through-holes 493a due to opening of the main valve 50 when the main valve 50 is controlled in an energized state (refer to FIG. 10).

Incidentally, in the fourth embodiment, the opening and closing member 490 has been described as being fixed to the valve housing 410 via the fixing member 493, but the present invention is not limited to the configuration, and an outer peripheral surface of the opening and closing member may be directly fixed to the inner peripheral surface of the valve housing.

The embodiments of the present invention have been described above with reference to the drawings; however, the specific configurations are not limited to the embodiments, and the present invention also includes changes or additions that are made without departing from the scope of the present invention.

For example, in the embodiments, the opening and closing member has been described as reciprocating relative to the pressure sensitive valve member in the axial direction; however, the present invention is not limited to the configuration and, for example, the opening and closing member may reciprocate relative to the pressure sensitive valve member in the axial direction while rotating and sliding with respect to the pressure sensitive valve member.

In addition, in the embodiments, the opening and closing member has been described as maintaining a state where the through-holes 52d of the pressure sensitive valve member 52 are completely closed, during normal control; however, the present invention is not limited to the configuration, and during normal control, the opening and closing member may maintain a state where the through-holes 52d are slightly opened, for example, a state where a half or more of each of the through-holes 52d in the axial direction is closed.

In addition, in the first and second embodiments, each of the first coil springs 91 and 291 forming the restriction means has been described as being formed of a conical coil spring; however, the present invention is not limited to the configuration, and each of the first coil springs 91 and 291 may be formed of, for example, a spring such as the same constant pitch coil spring as the second coil spring. In addition, the elastic body as restriction means may be a spring having a shape other than a coil shape.

In addition, in the embodiments, an example has been described in which the main and auxiliary valve body and the pressure sensitive valve member are formed as separate bodies, but both may be integrally formed.

In addition, in the pressure sensitive valve member 52, the base portion 52b and the flange portion 52c may be separately formed.

In addition, the communication passage and the fixed orifice may not be provided which provides direct communication between the control chamber 4 and the suction chamber 3 of the variable displacement compressor M.

In addition, the auxiliary valve 54 may not be provided, and as long as the step portion 51b on the axially right side of the main and auxiliary valve body 51 functions as a support member that receives an axial load, a sealing function of the step portion 51b is not necessarily required.

In addition, the pressure sensitive chamber 40 may be provided on an axially right side of the main valve chamber 20 in which the solenoid 80 is provided, and the auxiliary valve chamber 30 may be provided on an axially left side of the main valve chamber 20.

In addition, a coil spring may not be used inside the pressure sensitive body 60.

REFERENCE SIGNS LIST

1 Casing
2 Discharge chamber
3 Suction chamber
4 Control chamber
10 Valve housing
10a Main valve seat
10c Annular protrusion
10d Annular receiving portion
11 Partition adjustment member
12 Pd port (discharge port)
13 Ps port (suction port)
14 Pc port (control port)
20 Main valve chamber
30 Auxiliary valve chamber
40 Pressure sensitive chamber
50 Main valve
51 Main and auxiliary valve body (valve body)
51c Through-hole
52 Pressure sensitive valve member
52a Pressure sensitive valve seat
52b Base portion
52c Flange portion
52d Through-hole
52e Side surface
53 Pressure sensitive valve
54 Auxiliary valve
55 Intermediate communication passage
60 Pressure sensitive body 70 Adapter
70a Axially right end surface
80 Solenoid
90 Opening and closing member
90a Base portion (annular portion)
90b Protrusion portion
90c End surface
90d End surface
91 First coil spring (restriction device, elastic body, a pair of springs)
92 Second coil spring (restriction device, elastic body, a pair of springs)
290 Opening and closing member
291 First coil spring (restriction device, elastic body, a pair of springs)
292 Second coil spring (restriction device, elastic body, a pair of springs)
390 Opening and closing member
390a Base portion (annular portion)
390b Protrusion portion
392 Coil spring (restriction device, elastic body)
393 Stopper (restriction device)
490 Opening and closing member
490a Base portion (annular portion)
490b Groove
493 Fixing member (restriction device)
493a Through-hole
M Variable displacement compressor
V1 to V4 Capacity control valve

The invention claimed is:

1. A capacity control valve comprising:
a valve housing provided with a discharge port through which a discharge fluid of a discharge pressure passes, a suction port through which a suction fluid of a suction pressure passes, and a control port through which a control fluid of a control pressure passes;
a main valve including a valve body driven by a solenoid, and a main valve seat which is provided between the discharge port and the control port and with which the valve body is allowed to come into contact;
a pressure sensitive body disposed in a pressure sensitive chamber; and
a pressure sensitive valve member extending from the valve body to the pressure sensitive chamber and forming a pressure sensitive valve, together with the pressure sensitive body,
wherein an intermediate communication passage is formed in the valve body and in the pressure sensitive valve member, and the control port and the suction port are allowed to communicate with each other through the intermediate communication passage by opening the pressure sensitive valve,
the pressure sensitive valve member is provided with a through-hole communicating with the intermediate communication passage, and has an opening and closing member attached thereto such that the opening and closing member is restricted in movement with respect to the valve housing by a restriction device and slides relative to the pressure sensitive valve member to open and close the through-hole,
the restriction device includes an elastic body restricting movement of the opening and closing member, and
the elastic body is a pair of springs that press the opening and closing member in an opening direction and in a closing direction, respectively.

2. The capacity control valve according to claim 1,
wherein the opening and closing member includes an annular portion that is slidable relative to the pressure sensitive valve member.

3. The capacity control valve according to claim 1,
wherein the elastic body presses the opening and closing member toward a flange portion formed in the pressure sensitive valve member on a side of the pressure sensitive body with respect to the through-hole of the pressure sensitive valve member.

4. The capacity control valve according to claim 1,
wherein the restriction device includes a stopper that comes into contact with the opening and closing member.

5. The capacity control valve according to claim 1,
wherein the restriction device restricts movement of the opening and closing member by fixing the opening and closing member to the valve housing.

6. The capacity control valve according to claim 1,
wherein a dimension of the through-hole in an axial direction of the pressure sensitive valve member is equal to or less than a maximum stroke amount of the valve body.

7. The capacity control valve according to claim 2,
wherein the restriction device restricts movement of the opening and closing member by fixing the opening and closing member to the valve housing.

8. The capacity control valve according to claim 2,
wherein a dimension of the through-hole in an axial direction of the pressure sensitive valve member is equal to or less than a maximum stroke amount of the valve body.

9. The capacity control valve according to claim 3,
wherein a dimension of the through-hole in an axial direction of the pressure sensitive valve member is equal to or less than a maximum stroke amount of the valve body.

10. The capacity control valve according to claim 4,
wherein a dimension of the through-hole in an axial direction of the pressure sensitive valve member is equal to or less than a maximum stroke amount of the valve body.

11. The capacity control valve according to claim 5,
wherein a dimension of the through-hole in an axial direction of the pressure sensitive valve member is equal to or less than a maximum stroke amount of the valve body.

12. A capacity control valve comprising:
a valve housing provided with a discharge port through which a discharge fluid of a discharge pressure passes, a suction port through which a suction fluid of a suction pressure passes, and a control port through which a control fluid of a control pressure passes;
a main valve including a valve body driven by a solenoid, and a main valve seat which is provided between the discharge port and the control port and with which the valve body is allowed to come into contact;
a pressure sensitive body disposed in a pressure sensitive chamber; and
a pressure sensitive valve member extending from the valve body to the pressure sensitive chamber and forming a pressure sensitive valve, together with the pressure sensitive body,
wherein an intermediate communication passage is formed in the valve body and in the pressure sensitive valve member, and the control port and the suction port are allowed to communicate with each other through the intermediate communication passage by opening the pressure sensitive valve, the pressure sensitive valve member is provided with a through-hole communicating with the intermediate communication passage, and has an opening and closing member attached thereto such that the opening and closing member is restricted in movement with respect to the valve housing by a restriction device and slides relative to the pressure sensitive valve member to open and close the through-hole, the restriction device includes an elastic body restricting movement of the opening and closing member, and the elastic body presses the opening and closing member toward a flange portion formed in the pressure sensitive valve member on a side of the pressure sensitive body with respect to the through-hole of the pressure sensitive valve member.

13. The capacity control valve according to claim 12, wherein the opening and closing member includes an annular portion that is slidable relative to the pressure sensitive valve member.

14. The capacity control valve according to claim 12, wherein a dimension of the through-hole in an axial direction of the pressure sensitive valve member is equal to or less than a maximum stroke amount of the valve body.

15. The capacity control valve according to claim 13, wherein a dimension of the through-hole in an axial direction of the pressure sensitive valve member is equal to or less than a maximum stroke amount of the valve body.

16. A capacity control valve comprising:

a valve housing provided with a discharge port through which a discharge fluid of a discharge pressure passes, a suction port through which a suction fluid of a suction pressure passes, and a control port through which a control fluid of a control pressure passes;

a main valve including a valve body driven by a solenoid, and a main valve seat which is provided between the discharge port and the control port and with which the valve body is allowed to come into contact;

a pressure sensitive body disposed in a pressure sensitive chamber; and a pressure sensitive valve member extending from the valve body to the pressure sensitive chamber and forming a pressure sensitive valve, together with the pressure sensitive body, wherein an intermediate communication passage is formed in the valve body and in the pressure sensitive valve member, and the control port and the suction port are allowed to communicate with each other through the intermediate communication passage by opening the pressure sensitive valve, the pressure sensitive valve member is provided with a through-hole communicating with the intermediate communication passage, and has an opening and closing member attached thereto such that the opening and closing member is restricted in movement with respect to the valve housing by a restriction device and slides relative to the pressure sensitive valve member to open and close the through-hole, and the restriction device restricts movement of the opening and closing member by fixing the opening and closing member to the valve housing.

17. The capacity control valve according to claim 16, wherein the opening and closing member includes an annular portion that is slidable relative to the pressure sensitive valve member.

18. The capacity control valve according to claim 16, wherein a dimension of the through-hole in an axial direction of the pressure sensitive valve member is equal to or less than a maximum stroke amount of the valve body.

19. The capacity control valve according to claim 17, wherein a dimension of the through-hole in an axial direction of the pressure sensitive valve member is equal to or less than a maximum stroke amount of the valve body.

* * * * *